(12) United States Patent
Ennis et al.

(10) Patent No.: US 9,400,770 B2
(45) Date of Patent: *Jul. 26, 2016

(54) MULTI-VIEW GRAPHICAL USER INTERFACE FOR EDITING A BASE DOCUMENT WITH HIGHLIGHTING FEATURE

(75) Inventors: Patrick J. Ennis, Fall City, WA (US); Vlad G. Dabija, Mountain View, CA (US); Edward K. Y. Jung, Bellevue, WA (US); Royce A. Levien, Lexington, MA (US); Robert W. Lord, Seattle, WA (US); Mark A. Malamud, Seattle, WA (US); John D. Rinaldo, Jr., Bellevue, WA (US)

(73) Assignee: Elwha LLC, Bellevue, WA (US)

(*) Notice: Subject to any disclaimer, the term of this patent is extended or adjusted under 35 U.S.C. 154(b) by 591 days.

This patent is subject to a terminal disclaimer.

(21) Appl. No.: 12/930,148

(22) Filed: Dec. 28, 2010

(65) Prior Publication Data

US 2012/0166939 A1 Jun. 28, 2012

(51) Int. Cl.
*G06F 17/24* (2006.01)
*G06F 17/21* (2006.01)
*G06F 17/22* (2006.01)

(52) U.S. Cl.
CPC .......... *G06F 17/212* (2013.01); *G06F 17/2229* (2013.01); *G06F 17/24* (2013.01)

(58) Field of Classification Search
CPC ............................... G06F 17/24; G06F 17/212
USPC .......................................................... 715/255
See application file for complete search history.

(56) References Cited

U.S. PATENT DOCUMENTS

| 5,664,210 | A | * | 9/1997 | Fleming | ............... G06F 3/04892 715/246 |
| 6,012,070 | A | | 1/2000 | Cheng et al. | |
| 6,065,026 | A | * | 5/2000 | Cornelia | ................. G06F 17/24 715/202 |
| 6,240,430 | B1 | | 5/2001 | Deike et al. | |

(Continued)

OTHER PUBLICATIONS

Barnhill, Suzanne S.; "How can I make my document or template show a preview?"; Sbarnhill.mvps.org; Bearing dates of 2005 and 2008; pp. 1-6; Located at: http://sbarnhill.mvps.org/WordFAQs/PreviewPicture.htm; printed on Dec. 27, 2010.

(Continued)

*Primary Examiner* — William Bashore
*Assistant Examiner* — Nathan Shrewsbury

(57) ABSTRACT

A computationally implemented method includes, but is not limited to: receiving indication of an election of a rules packet, the elected rules packet including one or more rules for selecting one or more selective parts of a base document for selective presentation; and presenting a graphical user interface (GUI) for editing the base document, the GUI including at least a first view for displaying at least a segment of the base document and a second view for displaying at least a segment of the one or more selective parts of the base document selected based on the elected rules packet, the segment of the base document to be displayed through the first view including at least a portion of the one or more selective parts of the base document, and the portion of the one or more selective parts of the base document to be displayed through the first view being highlighted in the first view. In addition to the foregoing, other method aspects are described in the claims, drawings, and text forming a part of the present disclosure.

48 Claims, 23 Drawing Sheets

(56) References Cited

U.S. PATENT DOCUMENTS

| | | | |
|---|---|---|---|
| 6,430,542 B1 | 8/2002 | Moran | |
| 7,761,787 B2 * | 7/2010 | Singleton | G06F 17/24 715/222 |
| 7,954,043 B2 * | 5/2011 | Bera | G06F 17/30008 707/781 |
| 8,082,277 B1 * | 12/2011 | O'Brien | G06Q 10/101 707/758 |
| 8,209,248 B2 * | 6/2012 | Dubinsky | G06F 17/248 705/35 |
| 8,225,204 B2 * | 7/2012 | Cheng | G06F 17/211 715/206 |
| 2003/0130837 A1 * | 7/2003 | Batchilo et al. | 704/9 |
| 2003/0140053 A1 | 7/2003 | Vasey | |
| 2004/0051732 A1 * | 3/2004 | White | G06Q 10/10 715/736 |
| 2004/0243554 A1 * | 12/2004 | Broder | G06F 17/30613 |
| 2005/0033615 A1 | 2/2005 | Nguyen et al. | |
| 2005/0055332 A1 | 3/2005 | Vasey | |
| 2005/0102628 A1 | 5/2005 | Salesin et al. | |
| 2006/0103729 A1 * | 5/2006 | Burns | H04N 5/2251 348/207.1 |
| 2006/0159414 A1 * | 7/2006 | Wolf | G11B 27/034 386/282 |
| 2006/0259853 A1 * | 11/2006 | Zellweger | G06F 17/211 715/205 |
| 2007/0127073 A1 * | 6/2007 | Goel | G06K 15/02 358/1.18 |
| 2007/0208993 A1 | 9/2007 | Ritter | |
| 2007/0271509 A1 * | 11/2007 | Abernethy | G06F 17/24 715/256 |
| 2008/0025555 A1 | 1/2008 | Visan et al. | |
| 2008/0104535 A1 | 5/2008 | DeLine et al. | |
| 2008/0109425 A1 | 5/2008 | Yih et al. | |
| 2008/0120129 A1 | 5/2008 | Seubert et al. | |
| 2008/0184288 A1 | 7/2008 | Lipscomb | |
| 2008/0288413 A1 | 11/2008 | Weber | |
| 2008/0295005 A1 | 11/2008 | Salesin et al. | |
| 2009/0144157 A1 | 6/2009 | Saracino et al. | |
| 2010/0062410 A1 * | 3/2010 | Chiang | G09B 7/00 434/322 |
| 2011/0225506 A1 * | 9/2011 | Casalaina | G06F 17/30528 715/741 |
| 2012/0072821 A1 * | 3/2012 | Bowling | G06F 17/24 715/229 |
| 2012/0266064 A1 * | 10/2012 | Maguire | G06F 17/30905 715/255 |

OTHER PUBLICATIONS

"Gmail adds 'Attached' Document Previews"; Groovypost.com; Bearing a date of Oct. 15, 2009; pp. 1-3; Located at: http://www.groovypost.com/howto/google/gmail-adds-attached-document-previews/; printed on Dec. 27, 2010.

"Preview Documents Without Opening Them in Word 2007"; Howtogeek.com; Bearing a date of May 21, 2007; pp. 1-2; Located at: http://www.howtogeek.com/howto/microsoft-office/preview-documents-without-opening-them-in-word-2007/; printed on Dec. 27, 2010.

"Previewing a document"; Infrae.com; Bearing dates of 2002-2007; p. 1; Located at: https://www.infrae.com/products/silva/silva_docs_2_0/author_basic/preview_document; printed on Dec. 27, 2010.

"Essential Summarizer"; Mining Essential—Essential Mining; created on Sep. 3, 2015; pp. 1-9 (as provided by examiner); located at: https://essential-mining.com.

* cited by examiner

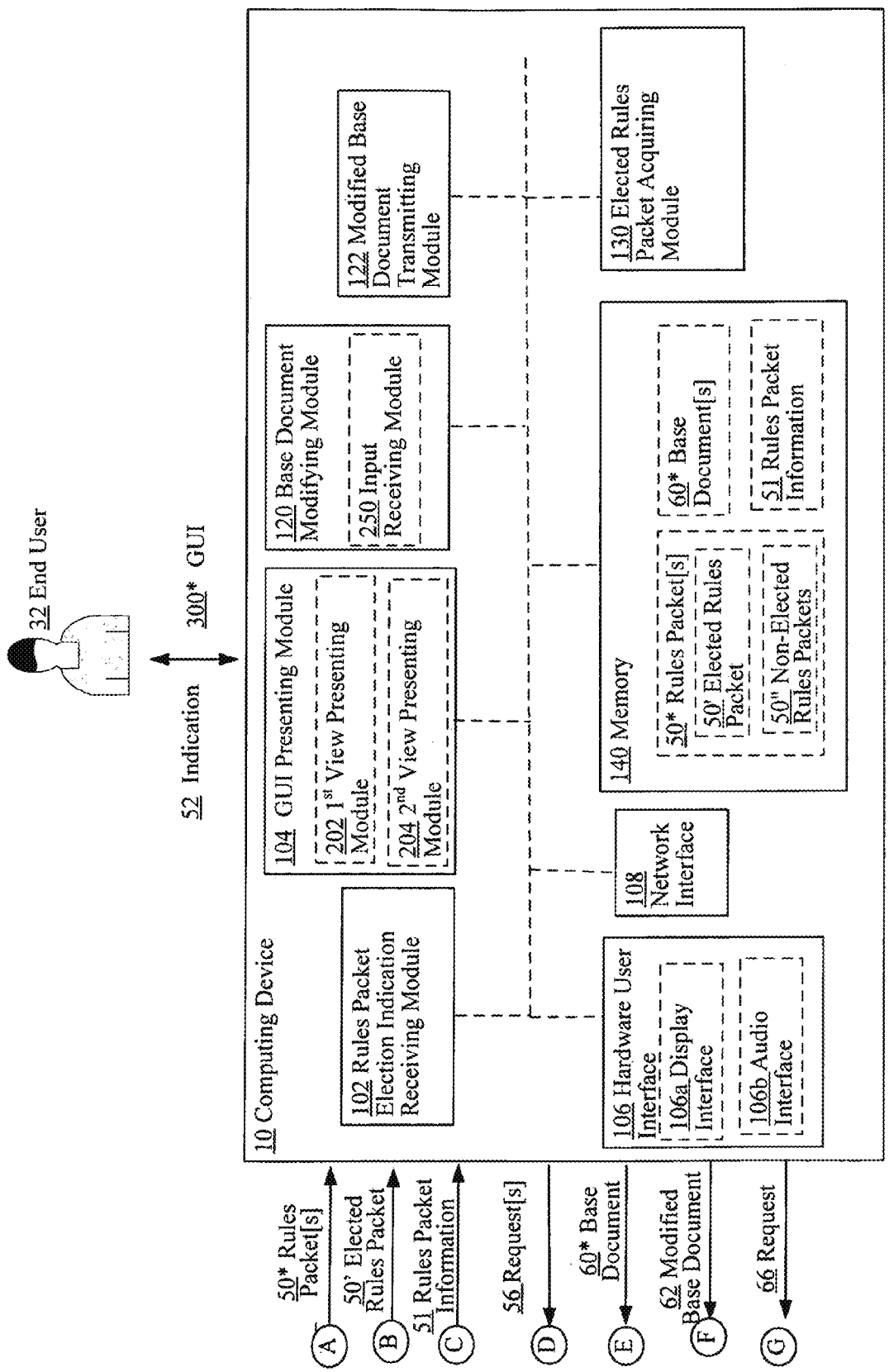

60'

61'

Hello Everyone,

In recent years, the computing/communication industry has enjoyed dramatic technological advancement that have resulted in the development of highly powerful and yet very portable personal communication devices that may be used in order to communicate through variety of communication mediums. For example, with the rapid development of personal communication devices such as cellular telephones, personal digital assistants (PDAs), Smartphones, I and so forth, users of such devices are now able to maintain 24/7 connectivity with other users at relatively low costs. Such connectivity may be via a variety of communication channels including, for example, telephone calls, emails, Voice over Internet Protocol (VoIP) calls, text messaging (e.g., short message service or SMS, or multimedia messaging service or MMS), instant messaging (IM), and so forth. Unfortunately, in addition to providing significant benefits to users, users of such technologies must also deal with a whole new slate of issues and problems that have also arisen with these new technologies.

61"

One problem that has arisen with respect to the use of such personal communication devices is the easy accessibility of such devices by third parties, which may compromise any confidential messages received through such devices. That is, such personal communication devices typically only have a single layer of security/protection (e.g.., requiring end users to merely provide a single username/password in order to access the personal communication). Needless to say, such minimal security protection has proven vastly inadequate for end users resulting in dire consequences as can be attested by, for example, Tiger Woods.

In the context of this background, we were thus presently surprise when Ms. Pebble Flintstone came into our office last Monday to introduce her invention, an audio/visual verification device which when embedded into personal communication devices will be able to provide superior security protection that will address these security issues. The audio/visual verification device is based on the concept that the combination of audio and visual input biometric data is a more reliable indicator that a, for example, a communication device is in the possession of the owner rather than entry of a simple username/password combination. Please join us next Tuesday in the main conference room when Ms. Flintstone reintroduces her novel invention.

61'''

See you there,

Bamm-Bamm Rubble

FIG. 3a

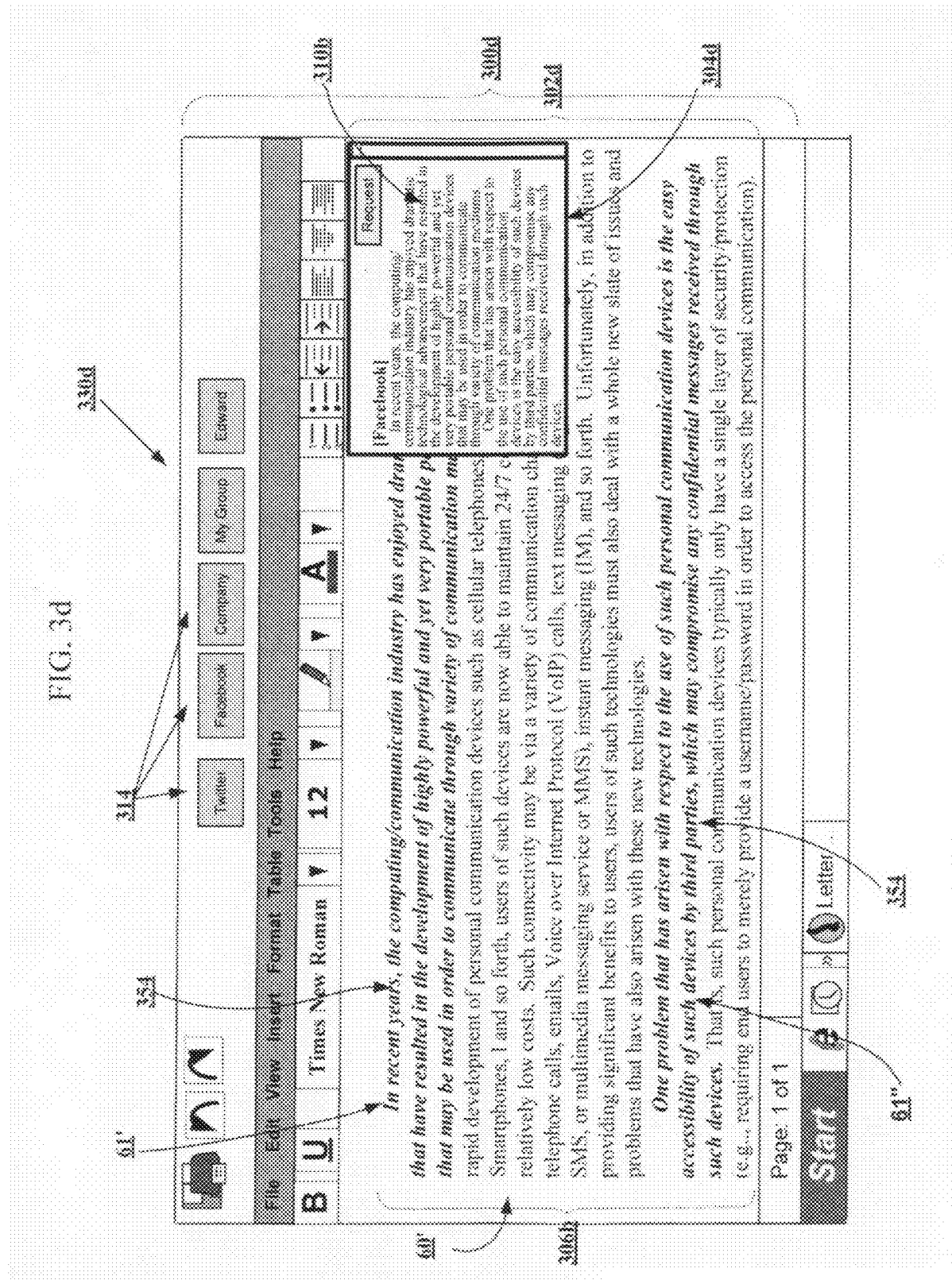

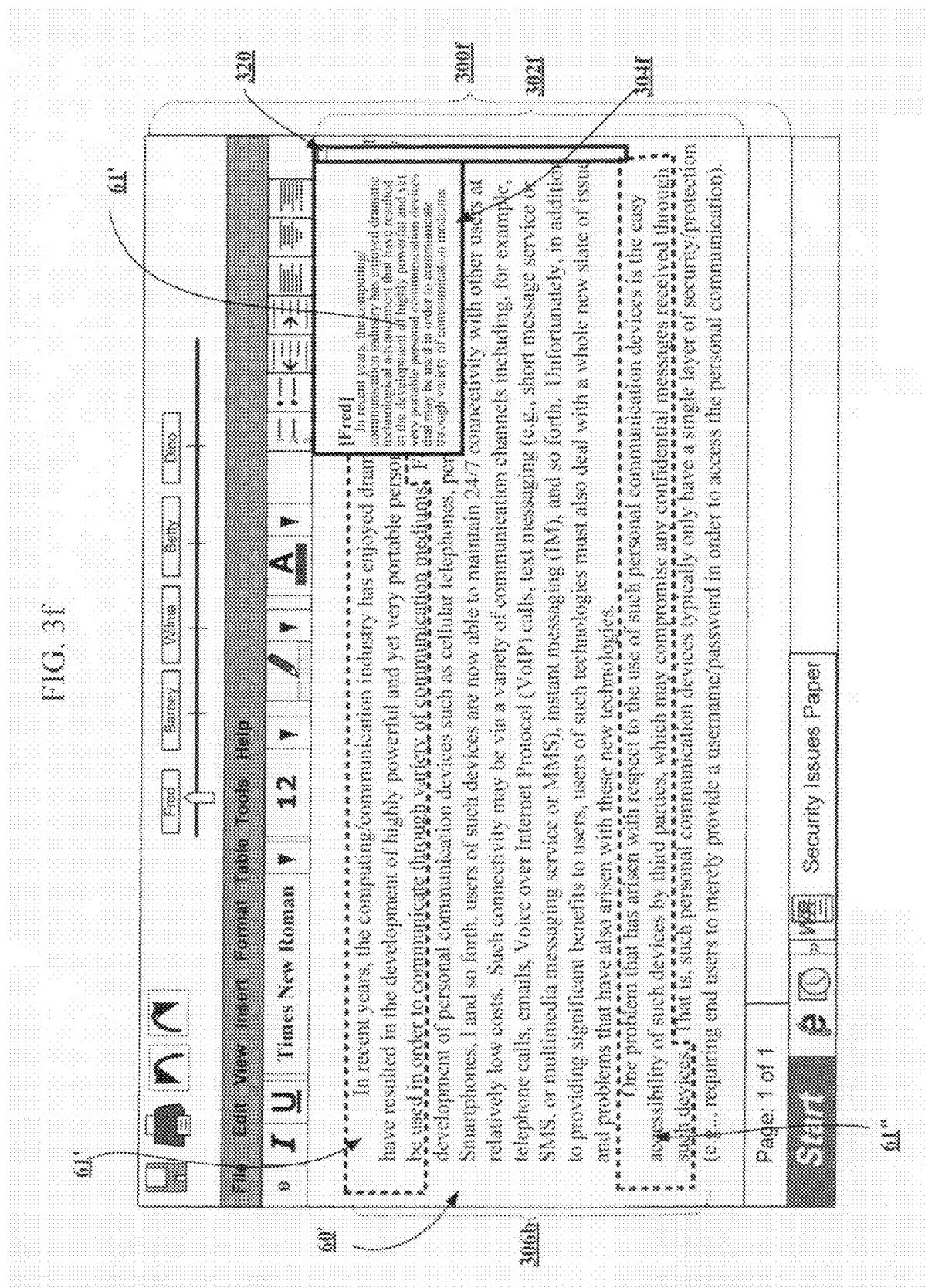

MULTI-VIEW GRAPHICAL USER INTERFACE FOR EDITING A BASE DOCUMENT WITH HIGHLIGHTING FEATURE

SUMMARY

A computationally implemented method includes, but is not limited to receiving indication of an election of a rules packet, the elected rules packet including one or more rules for selecting one or more selective parts of a base document for selective presentation; and presenting a graphical user interface (GUI) for editing the base document, the GUI including at least a first view for displaying at least a segment of the base document and a second view for displaying at least a segment of the one or more selective parts of the base document selected based on the elected rules packet, the segment of the base document to be displayed through the first view including at least a portion of the one or more selective parts of the base document, and the portion of the one or more selective parts of the base document to be displayed through the first view being highlighted in the first view. In addition to the foregoing, other method aspects are described in the claims, drawings, and text forming a part of the present disclosure.

In one or more various aspects, related systems include but are not limited to circuitry and/or programming for effecting the herein-referenced method aspects; the circuitry and/or programming can be virtually any combination of hardware, software, and/or firmware configured to effect the herein-referenced method aspects depending upon the design choices of the system designer.

A computationally implemented system includes, but is not limited to: means for receiving indication of an election of a rules packet, the elected rules packet including one or more rules for selecting one or more selective parts of a base document for selective presentation; and means for presenting a graphical user interface (GUI) for editing the base document, the GUI including at least a first view for displaying at least a segment of the base document and a second view for displaying at least a segment of the one or more selective parts of the base document selected based on the elected rules packet, the segment of the base document to be displayed through the first view including at least a portion of the one or more selective parts of the base document, and the portion of the one or more selective parts of the base document to be displayed through the first view being highlighted in the first view. In addition to the foregoing, other system aspects are described in the claims, drawings, and text forming a part of the present disclosure.

A computationally implemented system includes, but is not limited to: circuitry for receiving indication of an election of a rules packet, the elected rules packet including one or more rules for selecting one or more selective parts of a base document for selective presentation; and circuitry for presenting a graphical user interface (GUI) for editing the base document, the GUI including at least a first view for displaying at least a segment of the base document and a second view for displaying at least a segment of the one or more selective parts of the base document selected based on the elected rules packet, the segment of the base document to be displayed through the first view including at least a portion of the one or more selective parts of the base document, and the portion of the one or more selective parts of the base document to be displayed through the first view being highlighted in the first view. In addition to the foregoing, other system aspects are described in the claims, drawings, and text forming a part of the present disclosure.

An article of manufacture comprising a signal-bearing non-transitory storage medium bearing one or more instructions for receiving indication of an election of a rules packet, the elected rules packet including one or more rules for selecting one or more selective parts of a base document for selective presentation; and one or more instructions for presenting a graphical user interface (GUI) for editing the base document, the GUI including at least a first view for displaying at least a segment of the base document and a second view for displaying at least a segment of the one or more selective parts of the base document selected based on the elected rules packet, the segment of the base document to be displayed through the first view including at least a portion of the one or more selective parts of the base document, and the portion of the one or more selective parts of the base document to be displayed through the first view being highlighted in the first view. In addition to the foregoing, other computer program product aspects are described in the claims, drawings, and text forming a part of the present disclosure.

A method for presenting a graphical user interface (GUI) for editing a base document, the method includes receiving indication of an election of a rules packet, the elected rules packet including one or more rules for selecting one or more selective parts of a base document for selective presentation; and presenting, using a computing device, a graphical user interface (GUI) for editing the base document, the GUI including at least a first view for displaying at least a segment of the base document and a second view for displaying at least a segment of the one or more selective parts of the base document selected based on the elected rules packet, the segment of the base document to be displayed through the first view including at least a portion of the one or more selective parts of the base document, and the portion of the one or more selective parts of the base document to be displayed through the first view being highlighted in the first view.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

FIGS. 1a and 1b show a high-level block diagram of a computing device 10 operating in a network environment.

FIG. 3a shows an exemplary base document.

FIG. 3d shows another exemplary GUI in accordance with some implementations.

FIG. 3f shows another exemplary GUI in accordance with some implementations.

DETAILED DESCRIPTION

Figure 1A:
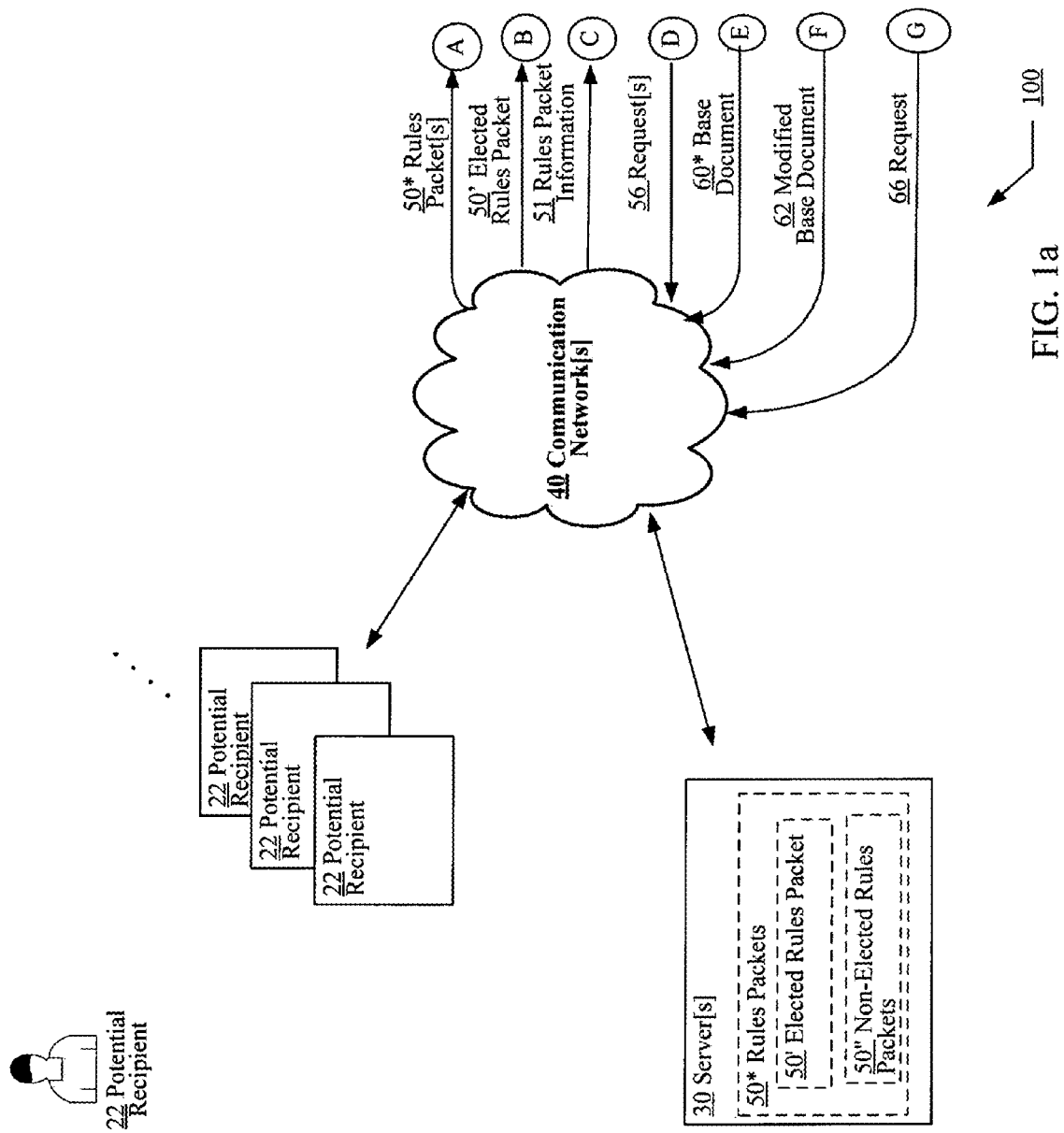

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

The extensive penetration of computing devices (e.g., laptop computers, desktop computers, workstations, computer tablets, net books, Smartphones, and so forth) into all segments of society over the last three decades have resulted in vast social/economic benefits generally enriching the lives of those who choose to take advantage of the benefits that such devices provides. Unfortunately, in addition to providing numerous benefits, users of such devices must also deal with a whole slate of problems and complications that have cropped up as a result of the widespread use of such devices. Among the issues faced by users is the problem of how to deal with the enormous volume of electronic documents that may be received through such devices. That is, the spectacular growth and unparallel advancement in computing technologies over the last few decades has made it easier for users (e.g., authoring users) of computing devices to rapidly generate and transmit huge amounts of electronic documents (e.g., productivity documents such as word processing documents, spreadsheet documents, and presentation documents, social networking documents such as documents in the form of social networking status reports or tweets, electronic messages such as emails, and so forth). Consequently, recipients of such electronic documents are now becoming increasingly deluged by such documents.

One possible solution to this problem is to provide a system that can automatically interpret received electronic documents to provide more digestible (e.g., summarized or condensed) views of the documents. In other words, to provide a system that automatically provides views of electronic documents that may be easier and/or quicker to review. Ideally such a system would be a robust system that is able to meet the different needs of multiple users. One way such a system could be implemented is by having recipients of electronic documents employ "rules packets" comprising of one or more rules (e.g., instructions or directives) for automatically selecting one or more parts (herein "selective parts") of electronic documents in order to automatically generate interpretive (e.g., summarized or condensed) views of the electronic documents. In some cases, in order to provide an interpreted view of an electronic document the selective parts of the electronic document that may have been selected by one or more rules of a rules packet may be directly used in the interpreted view without any interpretation or translation of the selective parts. In other cases, a rules packet may additionally include one or more rules for interpreting (e.g., summarizing) the one or more selective parts of the electronic document that were selected based on the rules packet.

In some cases, a rules packet may be specifically associated with (e.g., being specifically used by) a particular entity (e.g., a person, a business, a website such as a social networking website, etc.). For these cases, the rules packet may have been at least partly supplied or created/authored by the particular entity. Alternatively, a rules packet may be specifically associated with a particular group of entities (e.g., a group of people). In still other cases, a particular rules packet may not be associated with any particular entity (e.g., a specific person) or any particular group of entities. Rather, a rules packet may be associated with a particular communication channel or a particular group of communication channels. A1

For example, a plurality of rules packets may be used in order to provide different views of the same electronic document through different communication channels. For instance, suppose an electronic document is to be presented through different communication media (e.g., through a social networking website, through emails, through internal corporate channels, etc.). In this scenario, a particular rules packet may be used in order to provide a particular view of the electronic document through a social networking site, a second rules packet may be used in order to provide another view of the same electronic document through an email account, a third rules packet may be used in order to provide yet another view of the same document through internal corporate channels, and so forth.

One problem with implementing the above described rules packet system is that it may be difficult for authors of electronic documents (herein "base documents") to control what a particular recipient of such documents will actually see when they receive the documents. That is, by allowing the recipient to use his/her own rules packets (note that potential recipients of base documents may each employ multiple rules packets for use in multiple situations) or by allowing social networking web sites to use their own rules packets, the authors of the base documents have essentially no control over how recipients of the base documents will view the documents. That is, the use of rules packets may make it difficult to ensure that relevant or important information will actually be viewed by recipients of base documents.

Accordingly, and in accordance with various embodiments, methods, systems, and computer program products are provided that facilitate an authoring end user (e.g., author of a base document) to author/edit a base document in a way such that content that the authoring end user believes is, for example, important or relevant will actually be viewed by recipients of the base document even though the recipients may be employing their own rules packets. More particularly, and as will be further described herein, the methods, systems, and computer program products may be designed to receive an indication of an election of a rules packet, the elected rules packet including one or more rules for selecting one or more selective parts of a base document for selective presentation; and to present a graphical user interface (GUI) for editing the base document, the GUI including at least a first view for displaying at least a segment of the base document and a second view for displaying at least a segment of the one or more selective parts of the base document selected based on the elected rules packet, the segment of the base document to be displayed through the first view including at least a portion of the one or more selective parts of the base document, and the portion of the one or more selective parts of the base document to be displayed through the first view being highlighted in the first view.

In order to appreciate various aspects of the methods, systems, circuitry, and computer program product, we now turn to FIGS. 1a, and 1b illustrating an example environment 100 in which the methods, systems, circuitry, and computer program products in accordance with various embodiments may be implemented by a computing device 10. The computing device 10 may be any type of hardware device that may, in some cases, include one or more circuits including one or more processors (e.g., microprocessors, controllers, etc) for executing one or more functionalities. In various embodiments, the computing device 10 may be a laptop computer, a desktop computer, a workstation, a tablet computer, a web tablet (e.g., a Netbook), a Smartphone, or other types of computer devices.

In some embodiments, the computing device 10 may be a network device designed to communicate with other network devices (e.g., servers, other computing devices, etc.) via one or more communication networks 40. The one or more communication networks 40 illustrated in FIG. 1a may include one or more of a local area network (LAN), metropolitan area network (MAN), a wireless local area network (WLAN), a personal area network (PAN), a Worldwide Interoperability for Microwave Access (WiMAX), public switched telephone network (PTSN), a general packet radio service (GPRS) network, a cellular network, a Client/Server network, a virtual private network (VPN), and so forth.

In various embodiments, the computing device 10 may be designed to facilitate an end user 32 (e.g., an authoring end user) in editing (e.g., authoring and/or modifying) one or more base documents 60*. A base document 60* may be any one of a variety of electronic documents that may be created by the end user 32 using the computing device 10. Examples of a base document 60* includes, for example, a productivity document (e.g., a document generated using one or more productivity applications) such as a word processing document, a spreadsheet document, a presentation document (e.g., a document created using, for example, Microsoft PowerPoint Application), and so forth, a social networking document (e.g., a document created using a social networking application such as a status report), a messaging document (e.g., an email), and so forth. Note that in the following description, "*" represents a wildcard. Thus, references to base document 60* in the following may be in reference to the base document 60' illustrated in FIGS. 3a, 3b, 3c, 3d, 3e, and 3f, or to the base document 60" illustrated in FIG. 3h. Similarly, references in the following to a rules packet 50* may be in reference to elected rules packet 50' or in reference to non-elected rules packet 50" illustrated in FIGS. 1a and 1b.

In various embodiments, the computing device 10 may be designed to have access to one or more rules packets 50*. In some cases, at least one of the one or more rules packets 50* may be stored in memory 140. Alternatively or additionally at least one of the one or more rules packets 50* may be stored at one or more remote network sites (e.g., one or more servers 30 and/or one or more potential recipients 22, which may comprise of a person and a computer/communication device). When a particular rules packet 50* is stored at a remote network site, the computing device 10 may retrieve the rules packet 50* from the remote network site (e.g., server 30 or potential recipient 22) only when prompted to do so such as when an end user 32 requests for the rules packet 50*.

For example, and as will be further described herein, if an end user 32 who is authoring or editing a base document 60* wishes to see how a particular potential recipient 22 of the base document 60* will view the base document 60* using a particular rules packet 50' (herein elected rules packet 50'), then the end user 32 may elect for execution of the elected rules packet 50' associated with the particular potential recipient 22 from a plurality of rules packets 50* that may be accessible by the end user 32. The computing device 10, upon receiving an indication of election the elected rules packet 50' from the end user 32, may be designed to provide to the end user 32 the same view of the base document 60* that will be provided to the particular potential recipient 22 using the elected rules packet 50'. And as will be further described herein, the computing device 10 may also be designed to highlight portions of the base document 60* that will be used to generate the view of the base document 60* that will be displayed to the particular potential recipient 22. That is, such a feature allows the end user 32 to quickly determine/identify the selective parts 61* in the base document 60* (see, for example, selective parts 61', 61", 61'" of exemplary base document 60' of FIG. 3a) that will be used to generate the interpreted (e.g., summarized or condensed) view of the base document 60* that will be presented to the potential recipient 22. As a result, the authoring end user 32 may be facilitated in editing/modifying the base document 60* (e.g., to modify the selective parts 61* of the base document 60*) in such a way to ensure that relevant or important content will be shown to the potential recipient 22 when the potential recipient 22 views the base document 60* using his/her elected rules packet 50'.

As previously described, a rules packet 50* may include one or more rules (e.g., directives or instructions) for at least selecting one or more selective parts 61* of a base document 60*(see, for example, selective parts 61', 61", 61'" of exemplary base document 60' of FIG. 3a) for use in providing an interpreted (e.g., summarized or condensed) view of a base document 60*. Note that in various embodiments a rules packet 50* may be affiliated with a particular potential recipient 22 (e.g., the particular potential recipient 22 may have created or authored the rules packet 50* or may simply be intending to use the rules packet 50* when viewing the base document 60*), may be affiliated with a particular group of potential recipients 22, or may be affiliated with a particular communication medium (e.g., a social networking website, a business or professional communication channel, an electronic messaging network such as an email network, and so forth). A potential recipient 22 may be a person (e.g., a person with a computing/communication device), a website, a business, or any other entity that may receive and consume base documents 60*.

In various embodiments, the computing device 10 may be designed to store one or more rules packets 50*. In some embodiments, the computing device 10 may additionally or alternatively be initially provided with information (herein rules packet information 51) that indicates the existence/accessibility of various rules packets 50* that may be available via the one or more communication networks 40*. For these embodiments, the rules packets 50* of various potential recipients 22 (and/or various communication channels) may actually be stored with at least one of the one or more potential recipients 22 or at one or more servers 30 and may be provided to the computing device 10 upon request. Note that the phrase "potential" recipients 22 is used herein because many of the functional aspects of the computing device 10 to be described herein may occur prior to a potential recipient 22 actually receiving a base document 60*.

As a further illustration, suppose a potential recipient 22 employs a particular rules packet 50' (e.g., elected rules packet 50') for viewing base documents 60*. Suppose further that an end user 32, who is authoring a base document 60*, wants to see what the potential recipient 22 will actually see when provided with the base document 60 and when using his/her rules packet 50'. The end user 32 may then elect (e.g., select or choose) the rules packet 50' (e.g., elected rules packet 50') affiliated with the potential recipient 22 for execution. In some cases, the elected rules packet 50' may be selected from a plurality of rules packets 50* that may be identified as being available (e.g., accessible) to the computing device 10 or to the end user 32.

If the computing device 10 already has in its possession (e.g., stored in memory 140) the elected rules packet 50' or at least the latest version of the elected rules packet 50', then the elected rules packet 50' may be retrieved from a memory 140 and may be directly implemented in order to provide an interpretative view of the base document 60* (e.g., a condensed view of the base document 60* such as a view that shows only selective parts 61' of the base document 60* or a true interpretive or summarized view of the base document 60* in which the selective parts 61* of the base document 60* is actually interpreted or summarized) as may be displayed to the potential recipient 22. On the other hand, if the elected rules packet 50' or at least the latest version of the elected rules packet 50' is not in the possession of the computing device 10, then the computing device 10 may retrieve the elected rules packet 50' or at least the latest version of the elected rules packet 50' from the potential recipient 22 or from a server 30 by transmitting one or more requests 56 for the elected rules packet 50' to the potential recipient 22 and/or to one or more servers 30. In cases where the computing device 10 must retrieve the elected rules packet 50' via the one or more communication network 40, the computing device 10 may transmit one or more requests 56 for the elected rules packet 50' to one or more potential recipients 22 and/or to one or more servers 30.

As illustrated in FIGS. 3b to 3h and as will be further described below, in order to provide the above described functionalities, the computing device 10 may be designed to present (e.g., display) a graphical user interface (GUI) 300* to facilitate an end user 32 to author/edit, for example, a base document 60* in such a way to ensure that content (e.g., information or data) that the end user 32 deems relevant or important will actually be viewed by the potential recipient 22 of the base document 60* when the potential recipient 22 employs a particular rules module 50' to view the base document 60*.

In particular, the computing device 10 may present a GUI 300* that may allow the end user 32 to input, via a rules packet election feature 330*(see rules packet election features 330b, 330c, and 330d of FIGS. 3b, 3c, and 3d), an indication 52 of election of a rules packet 50'. The GUI 300* may be presented to the end user 32 via hardware user interface 106 that may include at least a display interface 106a (e.g., a display monitor such as a touch screen). In some cases, the hardware user interface 106 may further include an audio interface 106b (e.g., speakers and/or microphone) and/or other input/output devices including a keyboard or keypad, a mouse, a camera, and so forth. In some embodiments, the elected rules packet 50' that is elected by the end user 32 may be elected from a plurality of rules packets 50* that may be available to the computing device 10.

After receiving the indication 52 of the election of a rules packet 50', the computing device 10 may be designed to present the GUI 300* including at least a first view 302*(see, for example, FIGS. 3b to 3h) for displaying at least a segment 306* of a base document 60* and a second view 304*(see, for example, FIGS. 3b to 3h) for displaying at least a segment 310* of the one or more selective parts 61* of the base document 60* selected based on the elected rules packet 50', the segment 306* of the base document 60* to be displayed through the first view 302* including at least a portion of the one or more selective parts 61* of the base document 60*, and the portion of the one or more selective parts 61* of the base document 60* to be displayed through the first view 302* being highlighted in the first view 302. Note that and as will be further described there are a number of ways to highlight the portion of the one or more selective parts 61* of the base document 60* to be displayed through the first view 302* as illustrated in, for example, FIGS. 3b, 3c, and 3d.

After providing the GUI 300* including the first view 302* and the second view 304, the computing device 10 may be designed to facilitate the end user 32 to edit/modify the selective parts 61* of the base document 60* that are selected by the elected rules packet 50'. By facilitating the end user 32 to make such amendments, the end user 32 may control what the potential recipient 22 of the base document 60* will actually see even when the potential recipient 22 is using his/her own elected rules packet 50' in order to see an interpreted or summarized view of the base document 60*. Once the end user 32 revises the base document 60*, a modified base document 62 may be generated, which may then be transmitted to the potential recipient 22 (and/or to other potential recipients 22).

Turning specifically now to the computing device 10 of FIG. 1b. The computing device 10 as shown may include a variety of modules, sub-modules, and various other components. For example, in various embodiments the computing device 10 may include certain logic modules including at least a rules packet election indication receiving module 102 and a GUI presenting module 104 (which may further include a first view presenting module 202 and a second view presenting module 204). In some embodiments, the computing device 10 may further include other logic modules including, for example, a base document modifying module 120 (which may further include an input receiving module 250), a modified base document transmitting module 122, and/or an elected rules packet acquiring module 130.

As further illustrated in FIG. 1b, the computing device 10 may also include a hardware user interface 106, which may further include a display interface 106a and an audio interface 106*b* as briefly described earlier, a network interface 108 (e.g., a network interface card or NIC), and/or a memory 140 that may store one or more rules packets 50*(e.g., an elected rules packet 50' and/or one or more non-elected rules packets 50"), one or more base documents 60*, and/or rules packet information 51. Memory 140 may comprise of one or more of one or more mass storage devices, read-only memory (ROM), programmable read-only memory (PROM), erasable programmable read-only memory (EPROM), cache memory such as random access memory (RAM), flash memory, synchronous random access memory (SRAM), dynamic random access memory (DRAM), and/or other types of memory devices.

Figure 2A:
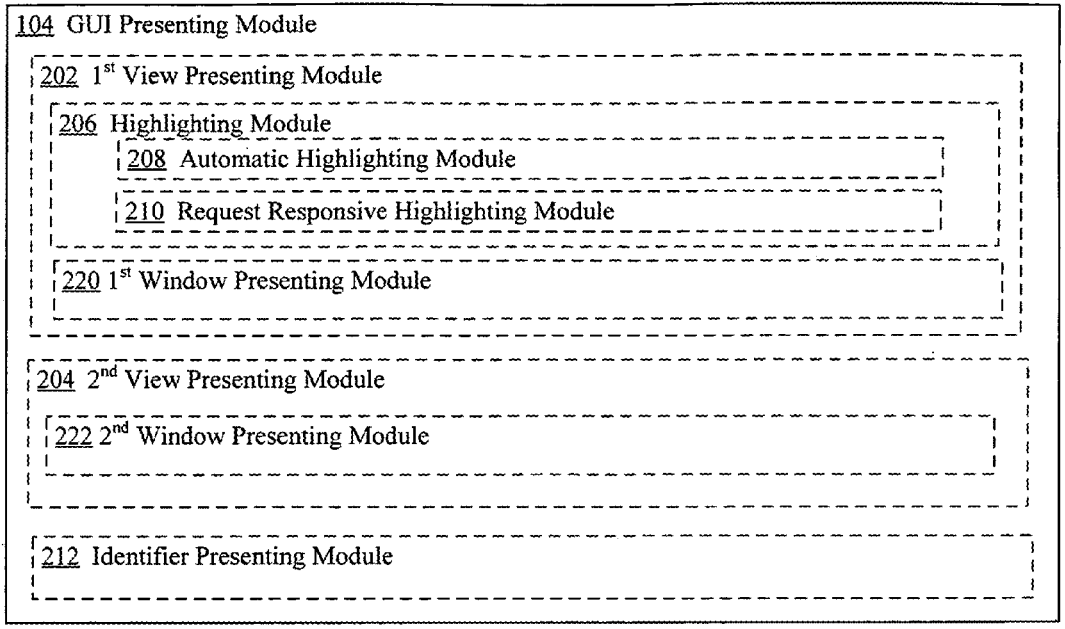
FIG. 2a shows another perspective of the GUI Presenting Module 104 of the computing device 10 of FIG. 1b.
Figure 2B:
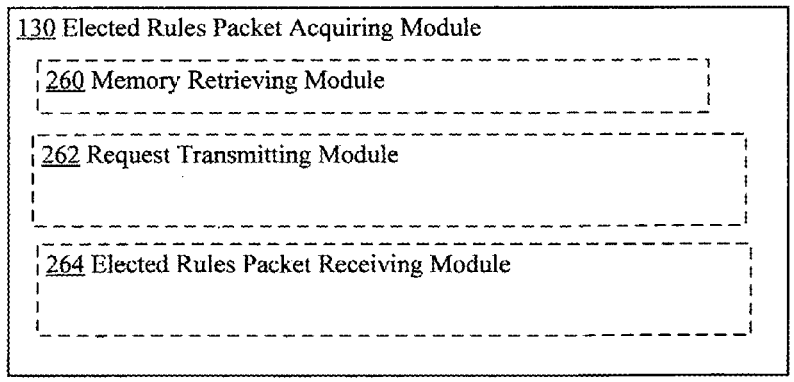
FIG. 2b shows another perspective of the elected rules packet acquiring module 130 of the computing device 10 of FIG. 1b.

Note the computing device 10 illustrated in FIG. 1*b* is the hardware or hardwired implementation of the computing device 10. That is, the various logic modules (e.g., the rules packet election indication receiving module 102, the GUI presenting module 104, the base document modifying module 120, the modified base document transmitting module 122, the elected rules packet acquiring module 130, and their sub-modules as illustrated in FIGS. 1*b*, 2*a*, and 2*b*) depicted in FIG. 1*b* are depicted as being implemented by hardwired circuitries (e.g., Application Specific Integrated Circuit or ASIC). However, those of ordinary skill in the art will recognize such logic modules may alternatively be implemented using hardware (e.g., one or more processors, ASIC, and/or field programmable gate array or FPGA), software, firmware, or any combination thereof. For example, and as will be further described below, FIG. 9 illustrates another implementation of the computing device 10 in which the various logic modules (e.g., the rules packet election indication receiving module 102, the GUI presenting module 104, and their sub-modules) of the computing device 10 may be implemented by one or more processors 902 executing one or more computer readable instructions 904.

In various embodiments, the rules packet election indication receiving module 102 of FIG. 1*b* may be designed to, among other things, receive indication 52 of an election of a rules packet 50', the elected rules packet 50' including one or more rules for selecting one or more selective parts 61* of a base document 60* for selective presentation. In contrast, the GUI presenting module 104 may be designed to present a graphical user interface (GUI) 300* for editing the base document 60*, the GUI 300* to be presented including at least a first view 302*(e.g., as provided by the first view presenting module 202) for displaying at least a segment 306* of the base document 60* and a second view 304*(e.g., as provided by the second view presenting module 204) for displaying at least a segment 310* of the one or more selective parts 61* of the base document 60* selected based on the elected rules packet 50', the segment 306* of the base document 60* to be displayed through the first view 302* including at least a portion of the one or more selective parts 61* of the base document 60*, and the portion of the one or more selective parts 61* of the base document 60* to be displayed through the first view 302* being highlighted in the first view 302.

Figure 9:
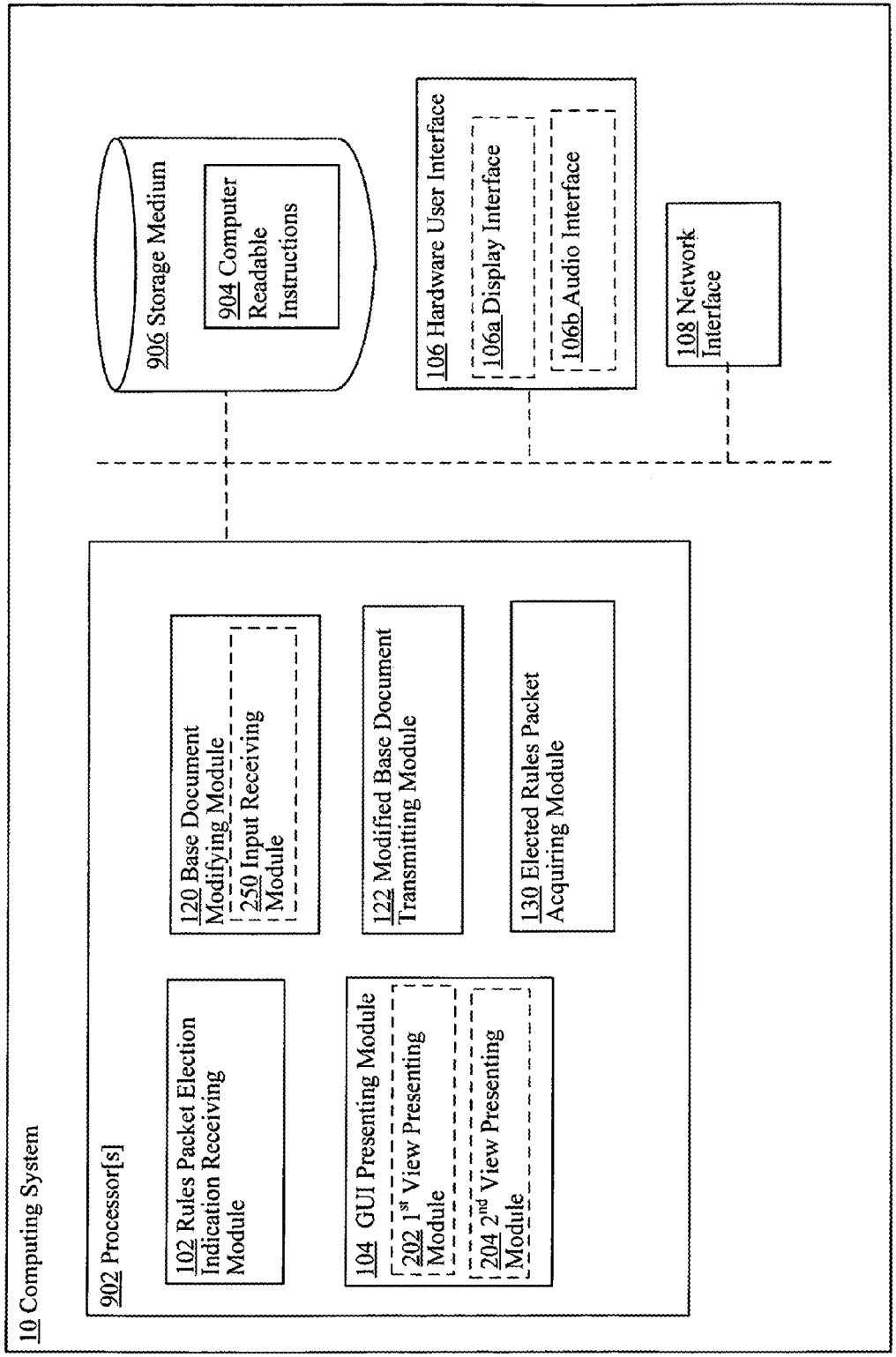
FIG. 9 is another high-level block diagram showing another implementation of the computing device 10 of FIG. 1b.

Referring now to FIG. 2*a* illustrating a particular implementation of the GUI presenting module 104 of FIG. 1*b* (as well as FIG. 9). As illustrated, the GUI presenting module 104 in addition to the first view presenting module 202 and the second view presenting module 204 may include one or more additional logic sub-modules in various alternative implementations. For example, in various implementations, the GUI presenting module 104 may include a first view presenting module 202 that includes a highlighting module 206 (which further comprises an automatic highlighting module 208 and/or a request responsive highlighting module 210) and/or a first window presenting module 220, a second view presenting module 204 that includes a second window presenting module 222, and/or an identifier presenting module 212.

As alluded to earlier, each of the logic sub-modules of the GUI presenting module 104 may be implemented using hardware (e.g., circuitry), software (e.g., computer readable instructions executed by one or more processors), firmware, or any combination thereof. Specific details related to the GUI presenting module 104 as well as the above-described sub-modules of the GUI presenting module 104 will be provided below in reference to the operations and processes to be described herein.

Referring now to FIG. 2*b* illustrating a particular implementation of the elected rules packet acquiring module 130 of FIG. 1*b*. As illustrated, and in accordance with various embodiments, the elected rules packet acquiring module 130 may include a memory retrieving module 260, a request transmitting module 262, and/or an elected rules packet receiving module 264. Each of the logic sub-modules of the elected rules packet acquiring module 130 may be implemented using hardware (e.g., circuitry including application specific integrated circuit—ASIC and/or processors), software (e.g., computer readable instructions executed by one or more processors), firmware, or any combination thereof. Specific details related to the elected rules packet acquiring module 130 as well as the above-described sub-modules of the elected rules packet acquiring module 130 will be provided below in reference to the operations and processes to be described herein. A more detailed discussion related to the computing device 10 of FIG. 1*b* and the various logic modules (e.g., the rules packet election indication receiving module 102, the GUI presenting module 104, the base document modifying module 120, the modified base document transmitting module 122, the elected rules packet acquiring module 130, and their logic sub-modules) depicted in FIGS. 1*b*, 2*a*, and 2*b* will be provided below with respect to the processes and operations (see, for example, FIGS. 4, 5*a*, 5*b*, 5*c*, 6*a*, 6*b*, 6*c*, 6*d*, 6*e*, 7, and 8) to be described herein.

Figure 3B:
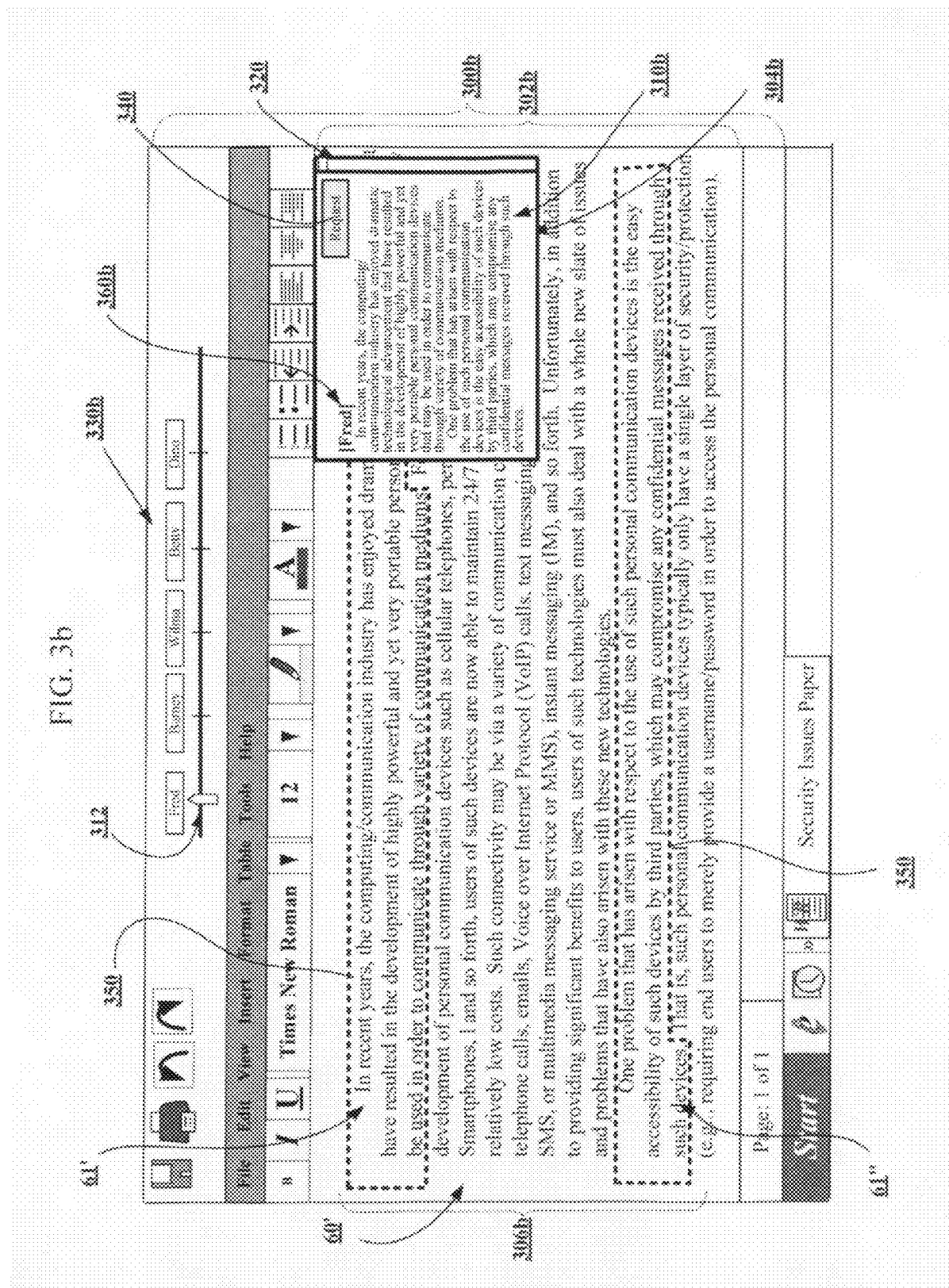
FIG. 3b shows an exemplary Graphical User Interface (GUI) in accordance with some implementations.

Referring now to FIG. 3*a* illustrating an example base document 60' that may be created/edited by an end user 32 using, for example, the computing device 10 of FIG. 1*b*. In particular, base document 60' is introduced herein in order to facilitate explanation and understanding of various types of graphical user interfaces (GUI) 300* that may be presented by the computing device 10 as illustrated in, for example, FIGS. 3*b* to 3*g*. The base document 60' illustrated in FIG. 3*a* is an exemplary message that may have been created/authored using the computing device 10 executing a word processing application. Assume for purposes of discussion that the elected rules packet 50' that was described above with respect to the example environment 100 of FIGS. 1*a* and 1*b* is to be used by a potential recipient 22 in order to generate an interpretative or summarized view of the example base document 60' of FIG. 3*b*. As a further illustration, suppose that the elected rules packet 50' includes at least one rule for selecting the first sentences of the first two paragraphs of a base document 60* and another rule for selecting any sentence in the base document 60' that includes the word "concept." As a result, if the elected rules packet 50' was to be applied to the base document 60' of FIG. 3*a*, then the underline portions (e.g., selective parts 61', 61", and 61''') of the base document 60' would be selected by the elected rules packet 50' for use in generating a interpreted or summarized view of the base document 60'.

Turning now to FIG. 3*b*, which illustrates an exemplary GUI 300*b* that may be presented by the computing device 10 of FIG. 1b for displaying and/or editing at least a portion of the base document 60' of FIG. 3a. The portion to be displayed and/or editing including one or more selective parts 61*(e.g., selective parts 61', 61", and/or 61''') of the base document 60' that are selected by the elected rules packet 50' for use in generating an interpretative (e.g., translated, deciphered, elaborated, condensed, or summarized) view of the base document 60'. Note that the simplest way to generate an interpretive view of the base document 60' is to create the interpretative view (e.g., second view 302b in FIG. 3b) by including into the interpretative view only selected portions (e.g., selective parts 61' and 61''') of the base document 60', thus providing in essence, a condensed view of the base document 60'.

As illustrated, the GUI 300b includes a rules packet election feature 330b that allows, for example, an end user 32 (who may be authoring or editing the base document 60') to elect a rules packet 50' from a plurality of rules packets 50* that may be available to the computing device 10. In this example illustration, each of the plurality of rules packets 50* may each be affiliated with corresponding names (e.g., in FIG. 3b, one rules packet 50* is affiliated with the name "Fred," another rules packet 50* is affiliated with the name "Barney," another rules packet 50* is affiliated with the name "Wilma," another rules packet 50* is affiliated with the name "Betty," and still another rules packet 50* is affiliated with the name "Dino").

The rules packet election feature 330b in order to allow the end user 32 to elect (e.g., select or choose) a particular rules packet 50* may include a slider component 312 for electing a rules packet 50' (in this case, a rules packet 51' affiliated with the name "Fred") from a plurality of rules packets 50*. Note that although the following figures (e.g., FIGS. 3b, 3c, 3d, and so forth) all appear to show that an elected rules packet 50' being elected from a plurality of rules packet 50*, in alternative implementations, however, the elected rules packet 50' may be elected from a single rules packet 50' (e.g., when the rules packet election feature 330b has only two choices to select or not to select a particular rules packet 50' rather than giving a choice to select a rules packet 50' from a plurality of rules packets 50*).

In addition to the rules packet election feature 330b, the GUI 300b of FIG. 3b may further include a first view 302b for displaying at least a segment 306b of the base document 60' and a second view 304b for displaying at least a segment 310b of the one or more selective parts 61*(see selective parts 61', 61", and 61''' in FIG. 3a) of the base document 60' that were selected based on the elected rules packet 50' that was elected using, for example, the rules packet election feature 330b. In various embodiments, the segment 306b of the base document 60' that may be displayed through the first view 302b includes at least a portion (e.g., selective parts 61' and 61") of the selective parts 61*(e.g., selective parts 61', 61", and 61''') of the base document 60' that may be selected by the elected rules packet 50', and the portion of the one or more selective parts 61* of the base document 60' to be displayed through the first view 302b being highlighted in the first view 302b. In some embodiments, the first view 302b and the second view 304b may be a first window and a second window.

Figure 3C:
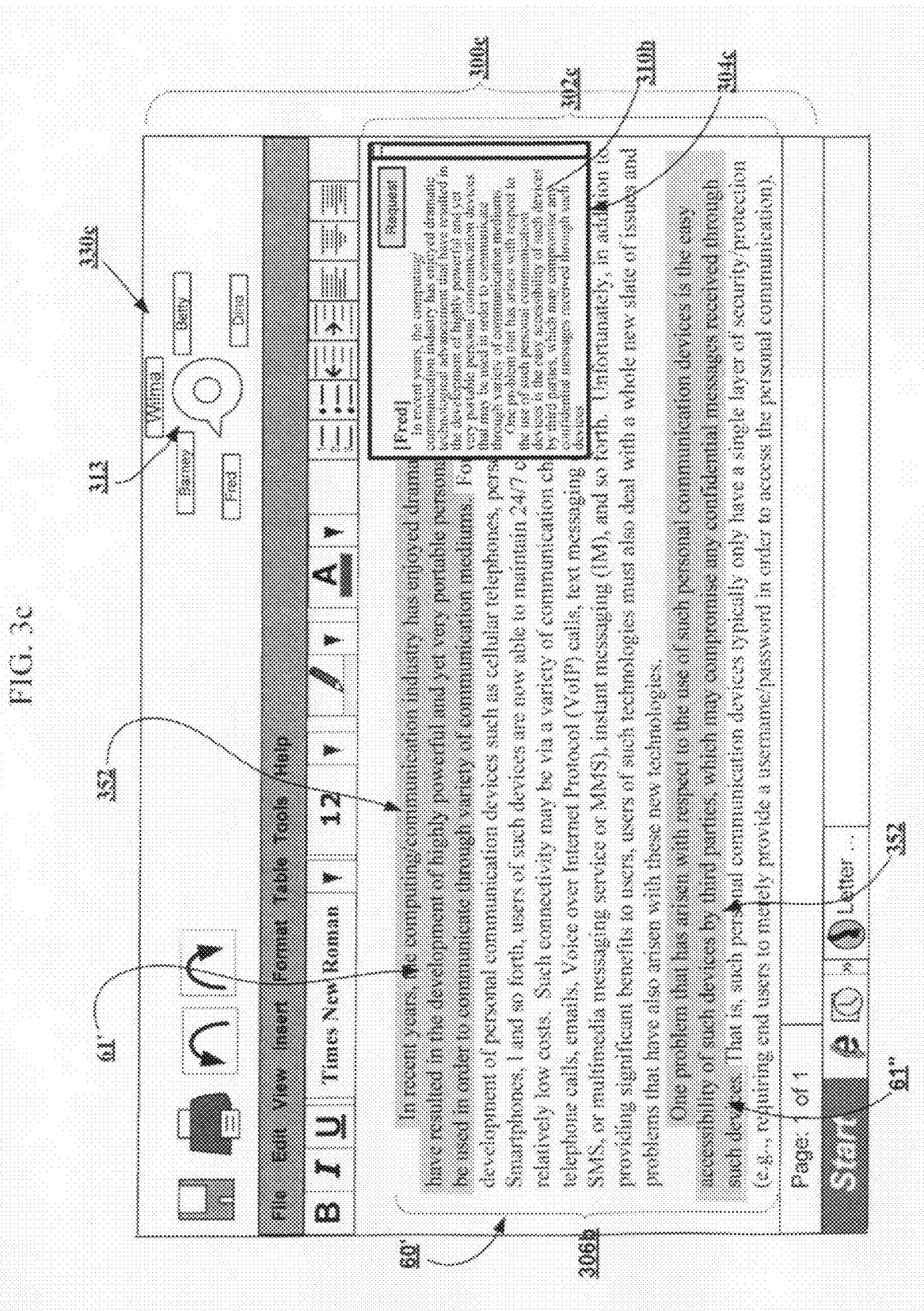
FIG. 3c shows another exemplary GUI in accordance with some implementations.

There are a number of ways to highlight the selective parts 61' and 61" of the base document 60" that may be displayed through the first view 302b as demonstrated in, for example, FIGS. 3b, 3c, and 3d. For example, the selective parts 61' and 61" of the base document 60" being displayed through the first view 302b in FIG. 3b are highlighted by being encircled by lines 350 (e.g., in FIG. 3b, the lines 350 are dotted lines). In contrast, and as will be further described herein, the selective parts 61' and 61" of the base document 60' may be highlighted in alternative ways in various alternative implementations as illustrated in, for example, FIGS. 3c and FIGS. 3d. For example, in FIG. 3c, the selective parts 61' and 61" of the base document 60' are highlighted by having a different background shading 352 from other parts of the base document 60' (note that alternatively or additionally the selective parts 61' and 61" could be highlighted by having a different background pattern from other parts of the base document 60'). In FIG. 3d, the selective parts 61' and 61" of the base document 60' are highlighted by having different font 254 from other parts of the base document 60' (note that alternatively or additionally the selective parts 61' and 61" could be highlighted by having a different color text from other parts of the base document 60'). Those having ordinary skill in the art will recognize that it may be possible to highlight the selective parts 61' and 61" of the base document 60' in many other ways in various alternative implementations.

With respect to the second view 304b of the GUI 300b, the second view 304b, in addition to displaying at least the segment 310b of the one or more selective parts 61* of the base document 60', may also display/include one or more additional components as illustrated in FIG. 3b. For example, in some cases, the second view 304b may be an interactive view or window that may be used in order to cause the selective parts 61' and 61" of the base document 60' that are displayed through the first view 302b to be highlighted in the first view 302b. For example, if the GUI 300b including the first view 302b and the second view 304b are presented through a touch screen then the highlighting of the selective parts 61' and 61" of the base document 60' that may be displayed through first view 302b may be prompted when any portion of the second view 304b is tapped (or pointed and clicked-on using a curser and mouse). Alternatively, the second view 304b may include a highlighting request button 340 that may need to be tapped-on or pointed and clicked-on in order prompt the highlighting. Note that although FIG. 3b illustrates the highlighting request button 340 being located within the second view 304b of the GUI 300b, in alternative implementations, the highlighting request button 340 may be located at other places in the GUI 300b.

In some cases, the second view 304b may show an identifier 360b (e.g., a name, a telephone number, an email address) that is associated with the elected rules packet 50' (or that is associated with a potential recipient 22 affiliated with the elected rules packet 50'). In some embodiments, the GUI 300b may include a scrolling feature 320, which may be part of or be coupled to the second view 304b, that allows the end user 32, for example, to scroll through the one or more selective parts 61* of the base document 60' via the second view 304b. Note that for ease of illustration and explanation the GUI 300b illustrated in FIG. 3b as well as the other GUIs 300c, 300d, 300e, 300f, 300g, and 300h (e.g., see FIGS. 3c, 3d, 3e, 3f, 3g, and 3h) to be described herein are graphical user interfaces for word processing documents. However, those having ordinary skill in the art will recognize that the various novel aspects of to the word processing GUIs 300b, 300c, 300d, etc. to be described herein may also be applicable to other types of GUIs (e.g., GUIs for spreadsheet applications, GUIs for presentation applications, GUIs for email applications, and so forth).

Turning now to FIG. 3c illustrating another exemplary GUI 300c that the computing device 10 of FIG. 1b may present for displaying and/or editing at least a portion of the base document 60' of FIG. 3a. The portion to be displayed and/or editing including one or more selective parts 61*(e.g., selective parts 61', 61", and/or 61''') of the base document 60' that are selected by the elected rules packet 50' for use in generating an interpretative (e.g., translated, deciphered, elaborated, condensed, or summarized) view of the base document 60'. The GUI 300c illustrated in FIG. 3c is similar to the GUI 300b of FIG. 3b including having a first view 302c for displaying at least a segment 306b of the base document 60' and a second view 304c for displaying at least the segment 310b of the one or more selective parts 61\* of the base document 60' that were selected based on the elected rules packet 50'. And similar to the GUI 300b of FIG. 3b, GUI 300c of FIG. 3c may also include a rules packet election feature 330c for electing a rules packet 50' from a plurality of rules packets 50\* that may be available to the computing device 10. However, unlike the rules packet election feature 330b of FIG. 3b that employs the slider component 312, the rules packet election feature 330c of FIG. 3c may employ a knob component 313 for electing a rules packet 50' from a plurality of packets 50\*.

FIG. 3d illustrates yet another exemplary GUI 300d that the computing device 10 of FIG. 1b may present for displaying and/or editing at least a portion of the base document 60' of FIG. 3a. The portion to be displayed and/or editing including one or more selective parts 61\* (e.g., selective parts 61', 61", and/or 61''') of the base document 60' that are selected by the elected rules packet 50' for use in generating an interpretative (e.g., translated, deciphered, elaborated, condensed, or summarized) view of the base document 60'. The GUI 300d illustrated in FIG. 3d is similar to the GUI 300b of FIG. 3b and the GUI 300c of FIG. 3c including having a first view 302d for displaying at least a segment 306b of the base document 60' and a second view 304d for displaying at least the segment 310b of the one or more selective parts 61\* of the base document 60' that were selected based on the elected rules packet 50'. And similar to the GUI 300b of FIG. 3b and the GUI 300c of FIG. 3c, GUI 300d of FIG. 3d may also include a rules packet election feature 330d for electing a rules packet 50' from a plurality of rules packets 50\* that may be available to the computing device 10. However, unlike the rules packet election feature 330b of FIG. 3b that employs the slider component 312 and the rules packet election feature 330c of FIG. 3c that employs the knob component 313, the rules packet election feature 330d of FIG. 3d may employ button components 314 for electing a rules packet 50' from a plurality of packets 50\*.

Although FIGS. 3b, 3c, and 3d illustrate three different types of rules packet election features 330\*, other types of election mechanisms may be employed in various other embodiments in order to select a rules packet 50' from a plurality of rules packets 50\* that may be available to the computing device 10. For example, in some alternative embodiments, a drop-down or pull-down menu with a listing of rules packets 50\* that may be available to the computing device 10 may be included with a GUI 300\* rather than the slider-type, knob-type, or button-type mechanism illustrated in FIGS. 3b, 3c, and 3d. Again, such a feature may be used in order to elect a rules packet 50' from the plurality of rules packets 50\*.

Figure 3E:
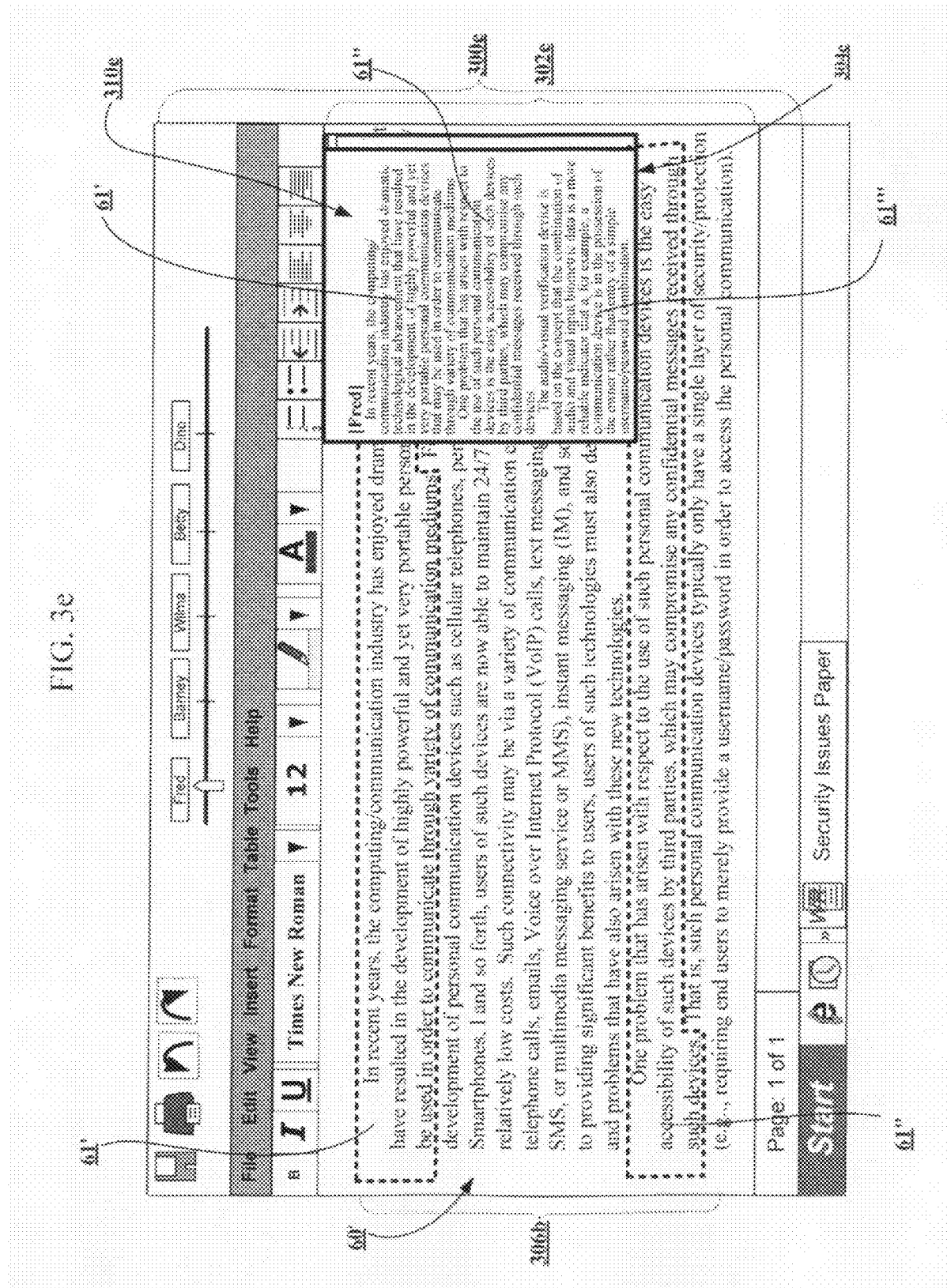
FIG. 3e shows another exemplary GUI in accordance with some implementations.

FIG. 3e illustrates still another exemplary GUI 300d that the computing device 10 of FIG. 1b may present for displaying and/or editing at least a portion of the base document 60' of FIG. 3a including one or more selective parts 61\* (e.g., selective parts 61', 61", and/or 61''') of the base document 60' that are selected by the elected rules packet 50' for use in generating an interpretative or summarized view of the base document 60'. The GUI 300e illustrated in FIG. 3e is similar to the GUI 300b, the GUI 300c, and the GUI 300d depicted in FIGS. 3b, 3c, and 3d in that GUI 300e includes a first view 302e for displaying at least a segment 306b of the base document 60' and a second view 304e for displaying at least a segment 310e of the one or more selective parts 61\* of the base document 60' that were selected based on the elected rules packet 50'. However, in this case, the GUI 300e includes a second view 304e that displays all of the selective parts 61\* (e.g., selective part 61', selective part 61", and selective part 61''') of the base document 60' that were selected based on the elected rules packet 50' rather than merely displaying only a portion of the selective parts 61\* of the base document 60' that were selected based on the elected rules packet 50' as was the case for the second views 304b, 304c, and 304d in FIGS. 3b, 3c, and 3d.

Note that although all of the GUIs 300 that are depicted in FIGS. 3b to 3h have a first view 302 and a second view 304\* that appear to be displayed concurrently together (e.g., by having the second view 304\*, which may be a window, being placed over a part of the first view 302\*, which may be another window). In alternative embodiments, however, the first view 302\* and the second view 304\* may be sequentially displayed one view at a time (e.g., such as in the case where the display device that the first and second views 302\* and 304\* are being displayed through is a relatively small display monitor such as in the case of a Smartphone or tablet computer) rather than being concurrently displayed.

Turning now to FIG. 3f illustrating another GUI 300f that may be presented by the computing device 10 of FIG. 1b. Similar to the previously described GUIs 300\* (e.g., GUI 300b, GUI 300c, GUI 300d, and GUI 300e), the GUI 300f illustrated in FIG. 3f includes a first view 302f and a second view 304f. However, unlike the previously described GUIs 300\*, the GUI 300f includes a second view 304f that is designed to display the one or more selective parts 61\* of the base document 60\* one selective part 61\* (e.g., selective part 61', selective part 61", or selective part 61''') at a time rather than displaying two or more selective parts at a time (in that in FIG. 3f, only selective part 61' is being displayed through the second view 3040. In some cases, the GUI 300f may include a scrolling feature 320 in order to allow, for example, the end user 320 to scroll through the base document 60\* in order to view each selective part 61\* of the base document 60\* one selective part 61\* at a time via the second view 304f.

Figure 3G:
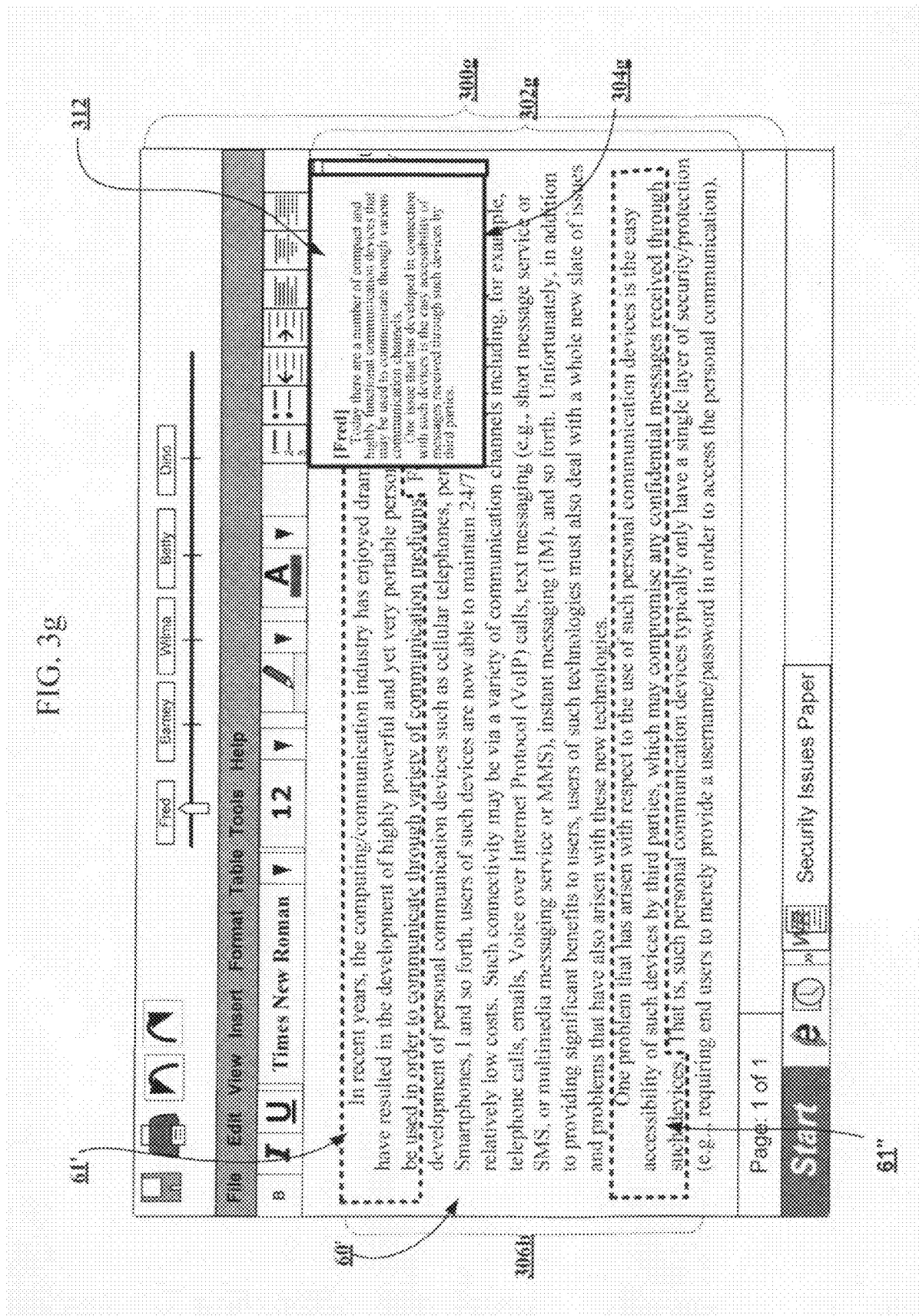
FIG. 3g shows another exemplary GUI in accordance with some implementations.

As previously indicated, in some cases the elected rules packet 50' that may be elected by end user 32 may include, in addition to one or more rules for selecting one or more selective parts 61\* of a base document 60\*, one or more rules for interpreting (e.g., providing semantics or summarizing) the one or more selective parts 61\* of the base document 60\*. That is, rather than merely providing a condensed version of a base document 60\* by presenting only selective parts 61\* of the base document 60\* via a second view 304\* of a GUI 300\* (e.g., as illustrated in FIGS. 3b to 30, in alternative embodiments, an interpretive version of the base document 60\* may be provided by presenting interpretive views of the selective parts 61\* of the base document 60\*. Referring now to FIG. 3g illustrating another GUI 300g that may be presented by the computing device 10 when the previously described elected rules packet 50', for example, includes one or more rules for interpreting (e.g., providing semantics of or summarizing meanings of) the one or more selective parts 61\* of a base document 60\* that are selected by the elected rules packet 50'. Similar to the other GUIs 300\* (e.g., GUI 300b, GUI 300c, etc.) illustrated in FIGS. 3b, 3c, 3d, 3e, and 3f, the GUI 300g of FIG. 3g includes a first view 302g and a second view 304g. However, and unlike the other GUIS 300\* that were previously described, the GUI 300g illustrated in FIG. 300g includes a second view 304g for displaying an interpreted view 312 of the selective parts 61*(e.g., selective parts 61' and 61") of the base document 60' that are selected by the elected rules packet 50'.

Figure 3H:
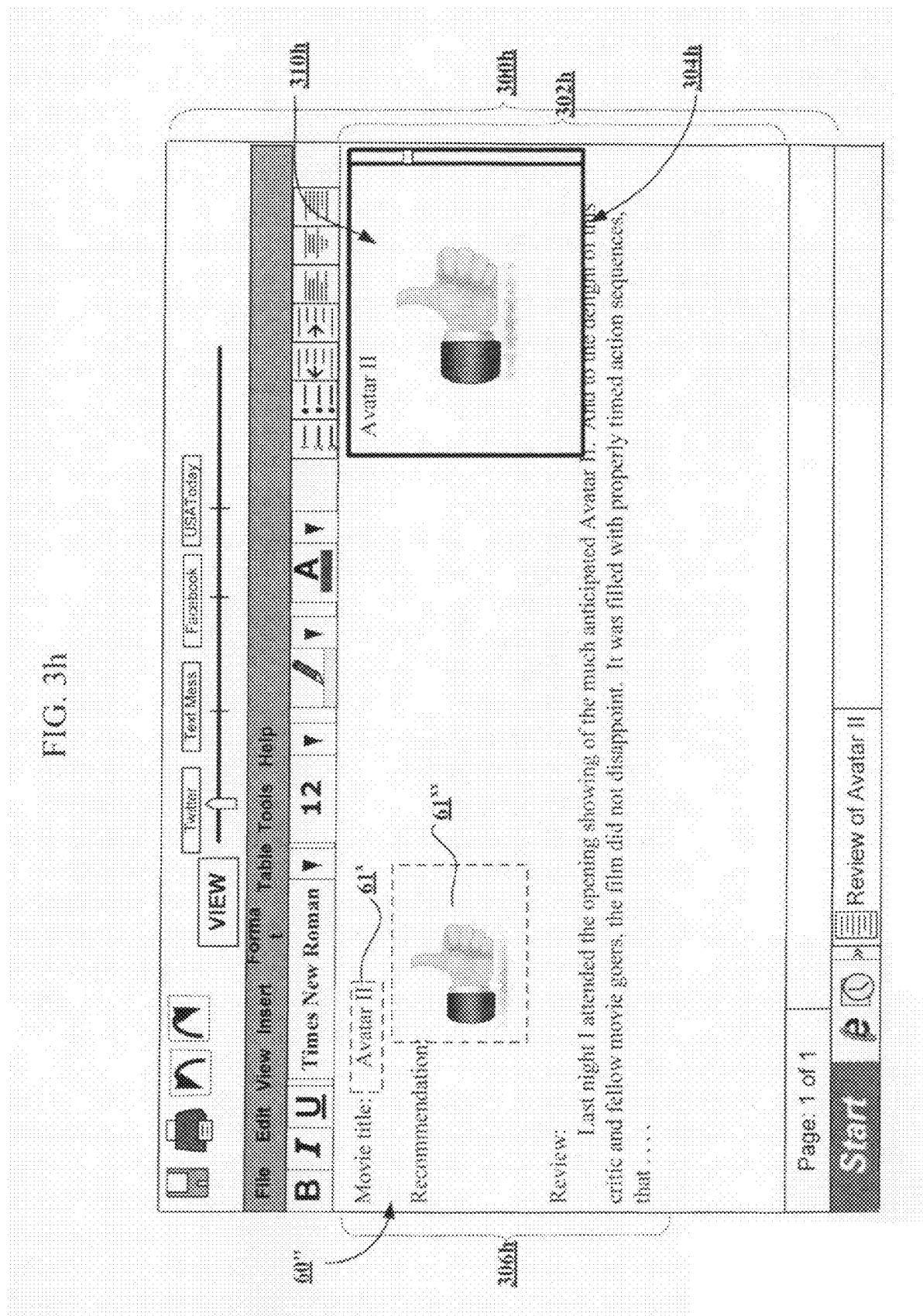
FIG. 3h shows another exemplary GUI in accordance with some implementations.

Turning now to FIG. 3h illustrating yet another GUI 300h that the computing device 10 of FIG. 1b may present for displaying and/or editing at least a portion of base document 60" including one or more selective parts 61*(e.g., selective parts 61$^x$ and 61") of the base document 60" that are selected by the elected rules packet 50' for use in generating an interpretative or summarized view of the base document 60". The GUI 300h illustrated in FIG. 3h includes a first view 302h for displaying at least a segment 306h of the base document 60' and a second view 304h for displaying at least the segment 310h of the one or more selective parts 61* of the base document 60" that were selected based on the elected rules packet 50' similar to the previously described and illustrated GUIs 300*(e.g., GUI 300b, GUI 300c, GUI 300d, GUI 300e, GUI 300f, and GUI 300g as illustrated in FIGS. 3b, 3c, 3d, 3e, 3f, and 3g). However, unlike the previously described GUIs 300*, the GUI 300h illustrated in FIG. 3h includes a second view 304h that displays a selective part 61$^{xx}$ of the base document 60" that comprises a figure or an image (e.g., a thumb-up icon) rather than a textual passage as previously depicted in the previously illustrated GUIs 300*.

Figure 4:
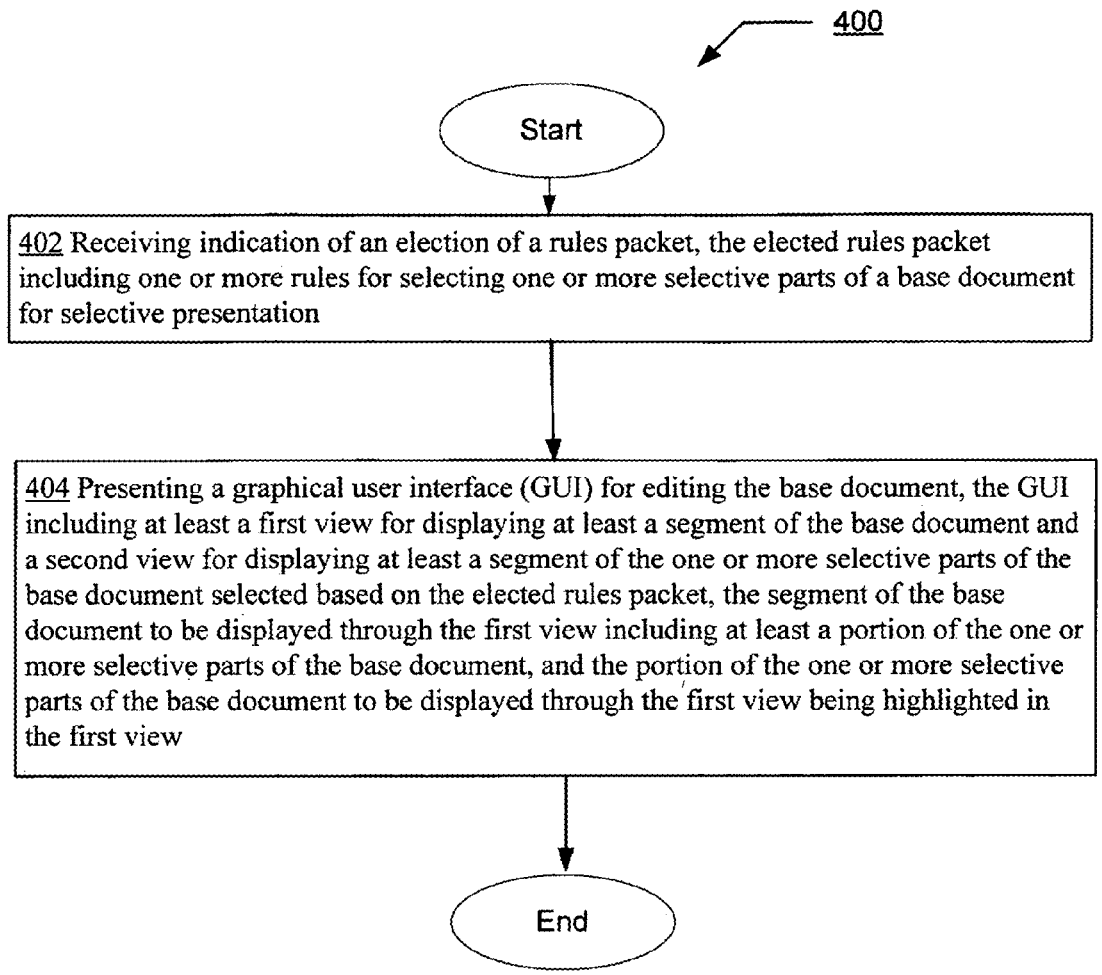
FIG. 4 is a high-level logic flowchart of a process.

A more detailed discussion related to the computing device 10 of FIG. 1b and the GUIs 300*(e.g., the GUIs 300* as illustrated in FIGS. 3b to 3h) that may be presented by the computing device 10 will now be provided with respect to the processes and operations to be described herein. FIG. 4 illustrates an operational flow 400 representing example operations for, among other things, presenting a graphical user interface (GUI) 300* for editing a base document 60*, the GUI 300* to be presented including at least a first view 302* for displaying at least a segment 306* of the base document 60* and a second view 304* for displaying at least a segment 310* of one or more selective parts 61* of the base document 60* selected based on an elected rules packet 50' that include one or more rules for selecting one or more selective parts 61* of the base document 60* for selective presentation, the segment 306* of the base document 60* to be displayed through the first view 302* including at least a portion of the one or more selective parts 61* of the base document 60*, and the portion of the one or more selective parts 61* (e.g., selective parts 61' and 61" in FIG. 3b) of the base document 60* to be displayed through the first view 302* being highlighted in the first view 302*. In FIG. 4 and in the following figures that include various examples of operational flows, discussions and explanations will be provided with respect to the exemplary environment 100 described above and as illustrated in FIGS. 1a and 1b, and/or with respect to other examples (e.g., as provided in FIGS. 2a, 2b, 3a, 3b, 3c, 3d, 3e, 3f, 3g, 3h, and 9) and contexts. However, it should be understood that the operational flows may be executed in a number of other environments and contexts, and/or in modified versions of FIGS. 1a, 1b, 2a, 2b, 3a, 3b, 3c, 3d, 3e, 3f, 3g, 3h, and 9. Also, although the various operational flows are presented in the sequence(s) illustrated, it should be understood that the various operations may be performed in other orders other than those which are illustrated, or may be performed concurrently.

Further, in FIG. 4 and in the figures to follow thereafter, various operations may be depicted in a box-within-a-box manner. Such depictions may indicate that an operation in an internal box may comprise an optional example embodiment of the operational step illustrated in one or more external boxes. However, it should be understood that internal box operations may be viewed as independent operations separate from any associated external boxes and may be performed in any sequence with respect to all other illustrated operations, or may be performed concurrently. Still further, these operations illustrated in FIG. 4 as well as the other operations to be described herein may be performed by at least one of a machine, an article of manufacture, or a composition of matter.

In any event, after a start operation, the operational flow 400 of FIG. 4 may move to a rules packet election indication receiving operation 402 for receiving indication of an election of a rules packet, the elected rules packet including one or more rules for selecting one or more selective parts of a base document for selective presentation. For instance, and as an illustration, the rules packet election indication receiving module 102 of the computing device 10 of the example environment 100 of FIGS. 1a and 1b receiving from an end user 32 an indication 52 of an election (e.g., selection or choice) of a rules packet 50', the elected rules packet 50' including one or more rules for selecting one or more selective parts 61* of a base document 60*(e.g., an electronic document such as a word processing document, a spreadsheet document, a presentation document, an electronic message such as an email, or other types of documents) for selective presentation (e.g., presenting the one or more selective parts 61* by displaying the one or more selective parts 61* as is or displaying interpreted or summarized versions of the one or more selective parts 61* of the base document 60*).

In addition to the rules packet election indication receiving operation 402, operational flow 400 may also include a GUI presenting operation 404 for presenting a graphical user interface (GUI) for editing the base document, the GUI including at least a first view for displaying at least a segment of the base document and a second view for displaying at least a segment of the one or more selective parts of the base document selected based on the elected rules packet, the segment of the base document to be displayed through the first view including at least a portion of the one or more selective parts of the base document, and the portion of the one or more selective parts of the base document to be displayed through the first view being highlighted in the first view as further illustrated in FIG. 4. For instance, the GUI presenting module 104 including the first view presenting module 202 and the second view presenting module 204 of the computing device 10 of FIG. 1b presenting (e.g., displaying) a graphical user interface (GUI) 300* for editing (e.g., authoring) the base document 60*, the GUI 300* including at least a first view 302*(e.g., as provided by the first view presenting module 202) for displaying at least a segment 306* of the base document 60* and a second view 304* (e.g., as provided by the second view presenting module 204) for displaying at least a segment 310* of the one or more selective parts 61* of the base document 60* selected based on the elected rules packet 50', the segment 306* of the base document 60* to be displayed through the first view 302* including at least a portion of the one or more selective parts 61* of the base document 60*, and the portion of the one or more selective parts 61* of the base document 60* to be displayed through the first view 302* being highlighted in the first view 302.

Figure 5A:
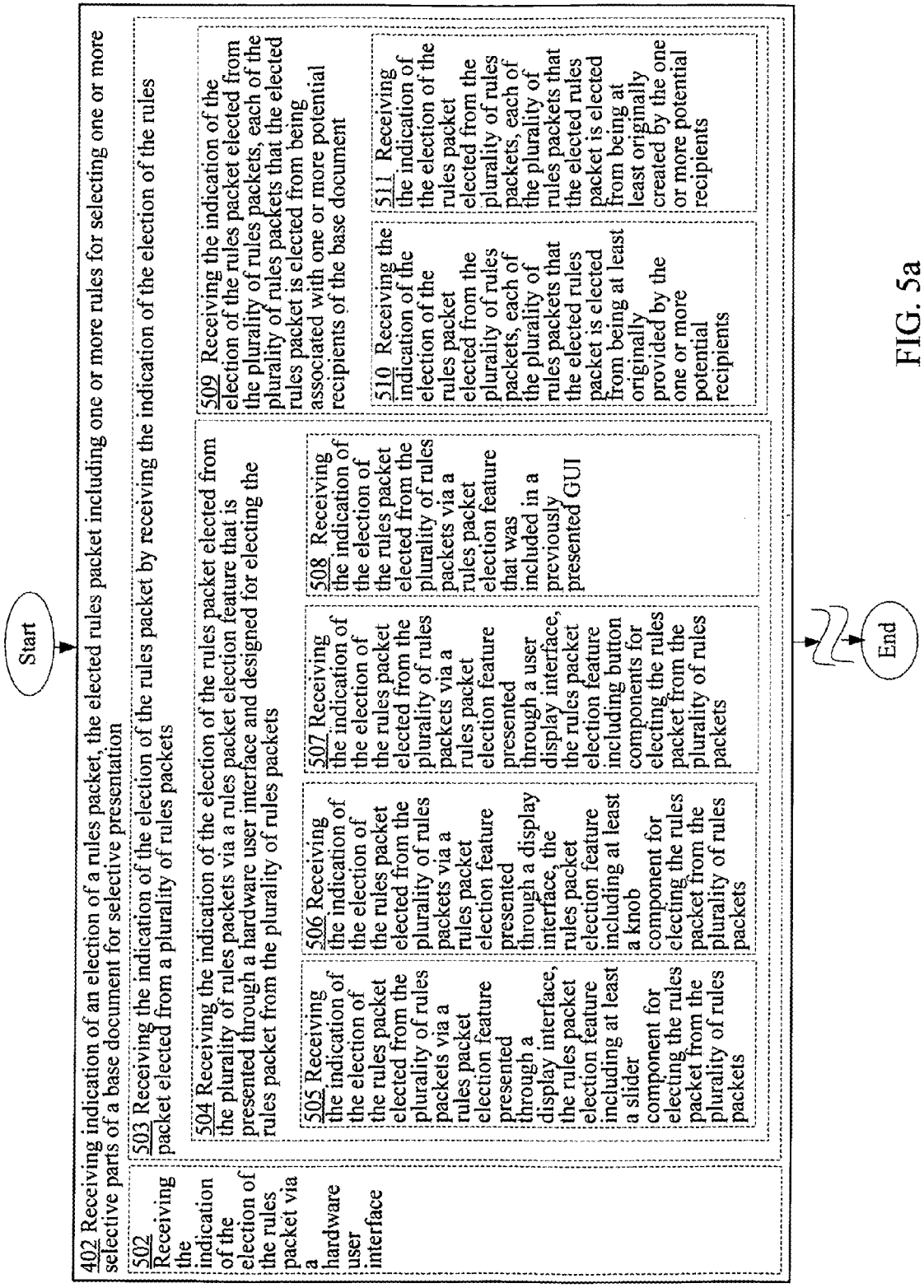
FIG. 5a is a high-level logic flowchart of a process depicting alternate implementations of the rules packet election indication receiving operation 402 of FIG. 4.
Figure 5B:
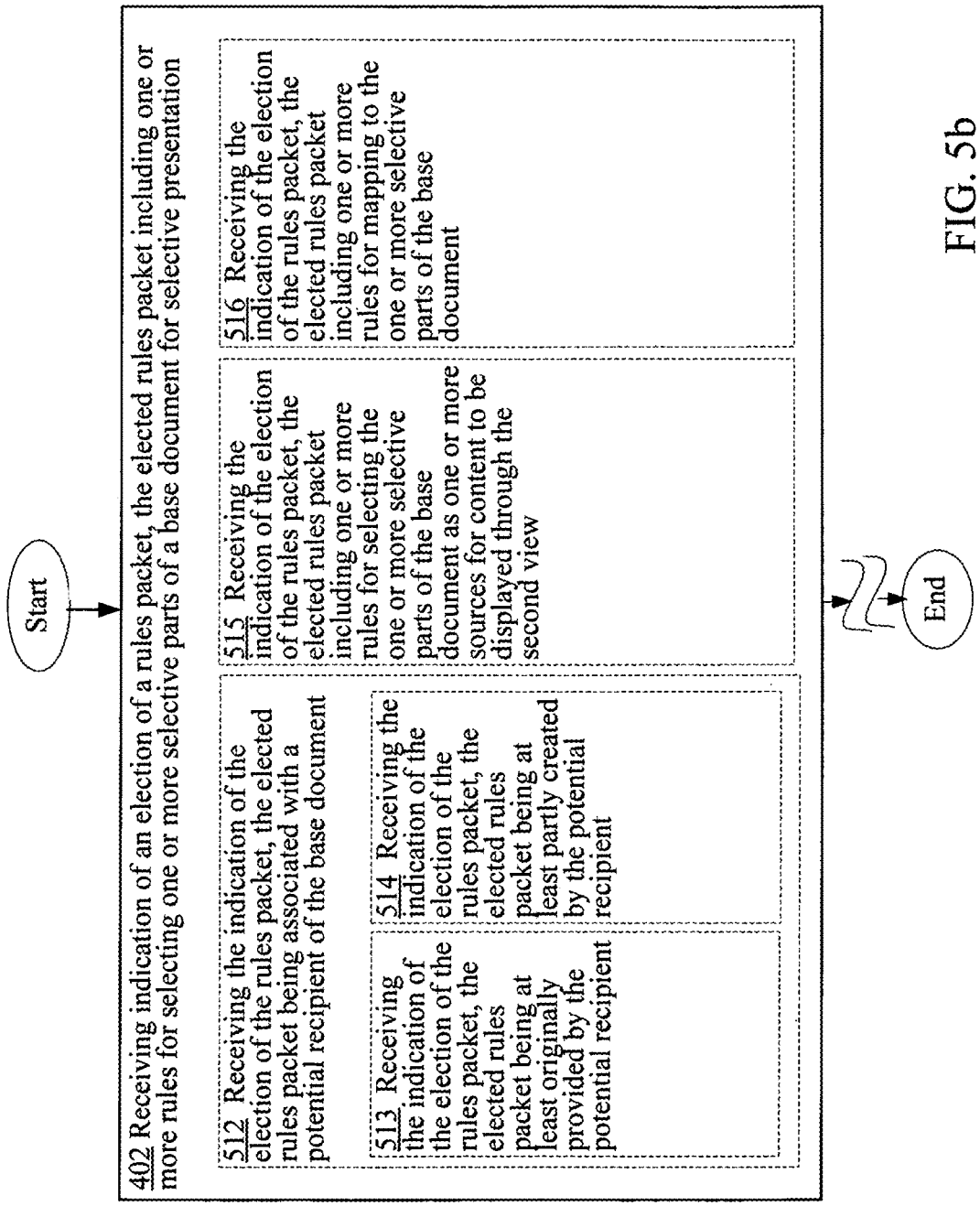
FIG. 5b is a high-level logic flowchart of a process depicting alternate implementations of the rules packet election indication receiving operation 402 of FIG. 4.
Figure 5C:
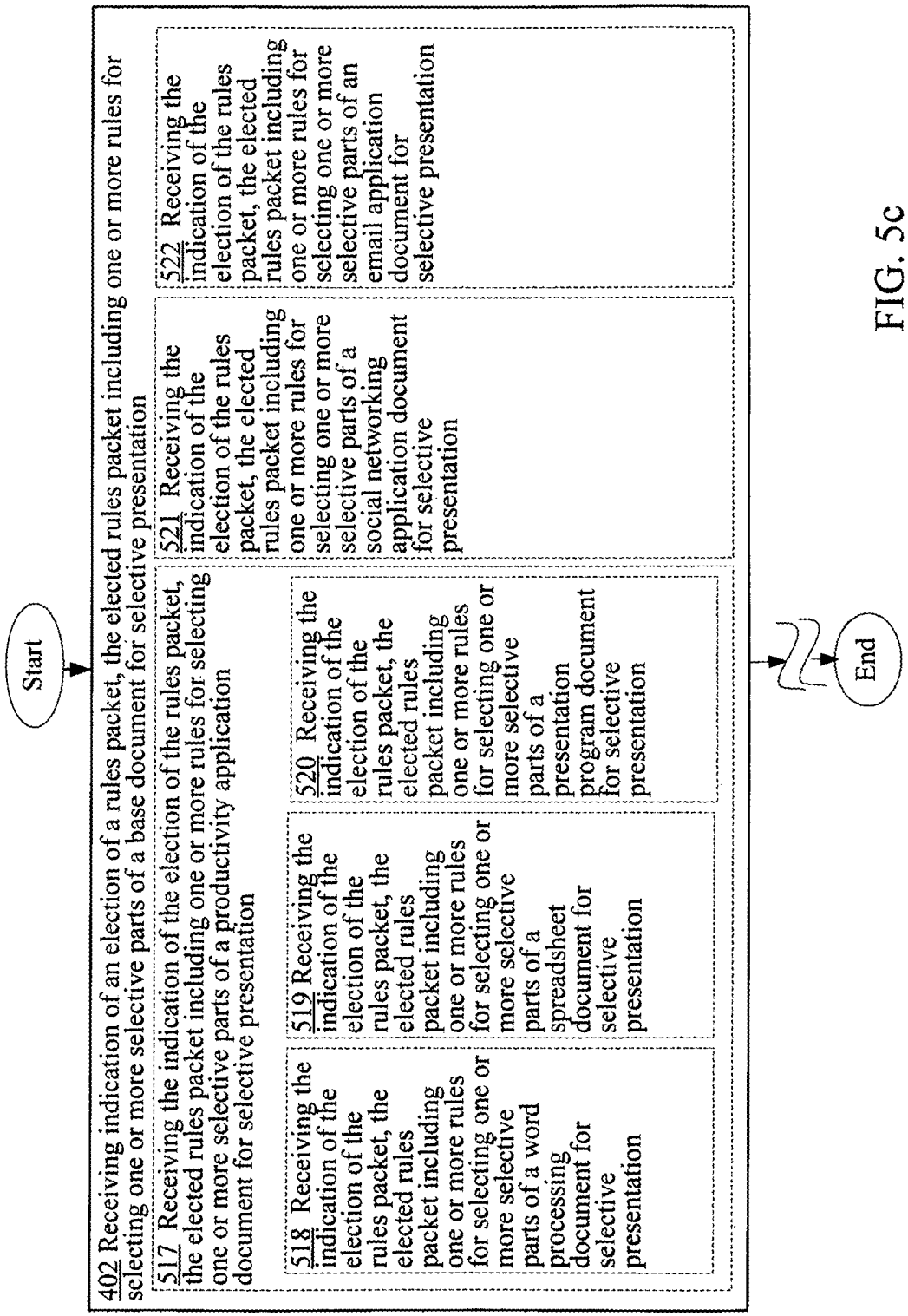
FIG. 5c is a high-level logic flowchart of a process depicting alternate implementations of the rules packet election indication receiving operation 402 of FIG. 4.

As will be further described herein, the rules packet election indication receiving operation 402 and the GUI presenting operation 404 of FIG. 4 may be executed in a variety of different ways in various alternative implementations. For example, FIGS. 5a, 5b, and 5c illustrate some of the various ways that the rules packet election indication receiving operation 402 of FIG. 4 may be executed in various alternative implementations. In some implementations, for example, the rules packet election indication receiving operation 402 of FIG. 4 may include an operation 502 for receiving the indication of the election of the rules packet via a hardware user interface as depicted in FIG. 5a. For instance, the rules packet election indication receiving module 102 of the computing device 10 of FIG. 1b receiving (e.g., receiving from an end user 32, who may be the author of the base document 60*) the indication 52 of the election of the rules packet 50' via a hardware user interface 106 (e.g., a touch screen, a mouse, a keypad or keyboard, a microphone, and/or other hardware input devices).

In some implementations, the rules packet election indication receiving operation 402 of FIG. 4 may include an operation 503 for receiving the indication of the election of the rules packet by receiving the indication of the election of the rules packet elected from a plurality of rules packets as further illustrated in FIG. 5a. For instance, the rules packet election indication receiving module 102 of the computing device 10 of FIG. 1b receiving the indication 52 of the election of the rules packet 50' by receiving the indication 52 of the election of the rules packet 50' elected from (e.g., selected from) a plurality of rules packets 50*.

In various implementations, the indication 52 of the election of the rules packet 50' received through operation 503 may be entered by, for example, an end user 32 via a rules packet election feature 330* that may have been presented through a hardware user interface 106 (e.g., a touch screen and/or a monitor/mouse/keyboard system). For example, and as further illustrated in FIG. 5a, operation 503 may include an operation 504 for receiving the indication of the election of the rules packet elected from the plurality of rules packets via a rules packet election feature that is presented through a hardware user interface and designed for electing the rules packet from the plurality of rules packets. For instance, the rules packet election indication receiving module 102 of the computing device 10 of FIG. 1b receiving the indication 52 of the election of the rules packet 50' elected from the plurality of rules packets 50* via a rules packet election feature 330* (which may be part of the GUI 300*) that is presented through a hardware user interface 106 (e.g., display monitor such as a touch screen) and designed for electing the rules packet 50' from the plurality of rules packets 50*.

In some implementations, operation 504 may further include one or more additional operations including an operation 505 for receiving the indication of the election of the rules packet elected from the plurality of rules packets via a rules packet election feature presented through a display interface, the rules packet election feature including at least a slider component for electing the rules packet from the plurality of rules packets as further depicted in FIG. 5a. For instance, the rules packet election indication receiving module 102 of the computing device 10 of FIG. 1b receiving the indication 52 of the election of the rules packet 50' elected from the plurality of rules packets 50* via a rules packet election feature 330b (see FIG. 3b) presented through a display interface 106a (e.g., a display monitor such as a touch screen, or a monitor/mouse/keyboard system), the rules packet election feature 330b including at least a slider component 312 (see FIG. 3b) for electing the rules packet 50' from the plurality of rules packets 50*.

In the same or different implementations, operation 504 may additionally or alternatively include an operation 506 for receiving the indication of the election of the rules packet elected from the plurality of rules packets via a rules packet election feature presented through a display interface, the rules packet election feature including at least a knob component for electing the rules packet from the plurality of rules packets. For instance, the rules packet election indication receiving module 102 of the computing device 10 of FIG. 1b receiving the indication 52 of the election of the rules packet 50' elected from the plurality of rules packets 50* via a rules packet election feature 330c (see FIG. 3c) presented through a display interface 106a (e.g., a display monitor such as a touch screen, or a combination of a display monitor and mouse), the rules packet election feature 330c including at least a knob component 313 (see FIG. 3c) for electing the rules packet 50' from the plurality of rules packets 50*.

In the same or different implementations, operation 504 may additionally or alternatively include an operation 507 for receiving the indication of the election of the rules packet elected from the plurality of rules packets via a rules packet election feature presented through a user display interface, the rules packet election feature including button components for electing the rules packet from the plurality of rules packets. For instance, the rules packet election indication receiving module 102 of the computing device 10 of FIG. 1b receiving the indication 52 of the election of the rules packet 50' elected from the plurality of rules packets 50* via a rules packet election feature 330d (see FIG. 3d) presented through a user display interface 106a (e.g., a display monitor such as a touch screen, or a combination of a display monitor and mouse), the rules packet election feature 330d including button components 314 (see FIG. 3d) for electing the rules packet 50' from the plurality of rules packets 50*.

In the same or different implementations, operation 504 may additionally or alternatively include an operation 508 for receiving the indication of the election of the rules packet elected from the plurality of rules packets via a rules packet election feature that was included in a previously presented GUI. For instance, the rules packet election indication receiving module 102 of the computing device 10 of FIG. 1b receiving the indication 52 of the election of the rules packet 50' elected from the plurality of rules packets 50* via a rules packet election feature 330* that was included in a previously presented GUI.

In some implementations, operation 503 may additionally or alternatively include an operation 509 for receiving the indication of the election of the rules packet elected from the plurality of rules packets, each of the plurality of rules packets that the elected rules packet is elected from being associated with one or more potential recipients of the base document as further illustrated in FIG. 5a. For instance, the rules packet election indication receiving module 102 of the computing device 10 of FIG. 1b receiving the indication 52 of the election of the rules packet 50' elected from the plurality of rules packets 50*, each of the plurality of rules packets 50* that the elected rules packet 50' is elected from (e.g., selected or chosen from) being associated with (e.g., originate from) one or more potential recipients 22 of the base document 60*.

As also illustrated in FIG. 5a, operation 509 may additionally include one or more additional operations including an operation 510 for receiving the indication of the election of the rules packet elected from the plurality of rules packets, each of the plurality of rules packets that the elected rules packet is elected from being at least originally provided by the one or more potential recipients. For instance, the rules packet election indication receiving module 102 of the computing device 10 of FIG. 1b receiving the indication 52 of the election of the rules packet 50' elected from the plurality of rules packets 50*, each of the plurality of rules packets 50* that the elected rules packet 50' is elected from being at least originally provided by the one or more potential recipients 22.

In the same or alternative implementations, operation 509 may additionally or alternatively include an operation 511 for receiving the indication of the election of the rules packet elected from the plurality of rules packets, each of the plurality of rules packets that the elected rules packet is elected from being at least originally created by the one or more potential recipients. For instance, the rules packet election indication receiving module 102 of the computing device 10 of FIG. 1b receiving the indication 52 of the election of the rules packet 50' elected from the plurality of rules packets 50*, each of the plurality of rules packets 50* that the elected rules packet 50' is elected from being at least originally created by the one or more potential recipients 22.

Turning now to FIG. 5b, in various implementations, the elected rules packet referred to in the rules packet election indication receiving operation 402 of FIG. 4 may be affiliated with a potential recipient of the base document. For example, and as illustrated in FIG. 5b, the rules packet election indication receiving operation 402 of FIG. 4 may include an operation 512 for receiving the indication of the election of the rules packet, the elected rules packet being associated with a potential recipient of the base document in various implementations. For instance, the rules packet election indication receiving module 102 of the computing device 10 of FIG. 1b receiving the indication 52 of the election of the rules packet 50', the elected rules packet 50* being associated with (e.g., being provided by or authored by) a potential recipient 22 of the base document 60*.

In some implementations, operation 512 may include an operation 513 for receiving the indication of the election of the rules packet, the elected rules packet being at least originally provided by the potential recipient as further depicted in FIG. 5b. For instance, the rules packet election indication receiving module 102 of the computing device 10 of FIG. 1b receiving the indication 52 of the election of the rules packet 50', the elected rules packet 50' being at least originally provided by the potential recipient 22.

In the same or different implementations, operation 512 may additionally or alternatively include an operation 514 for receiving the indication of the election of the rules packet, the elected rules packet being at least partly created by the potential recipient as further depicted in FIG. 5b. For instance, the rules packet election indication receiving module 102 of the computing device 10 of FIG. 1b receiving the indication 52 of the election of the rules packet 50', the elected rules packet 50' being at least partly created (e.g., at least partly authored) by the potential recipient 22.

As further illustrated in FIG. 5b, in some implementations, the rules packet election indication receiving operation 402 of FIG. 4 may additionally or alternatively include an operation 515 for receiving the indication of the election of the rules packet, the elected rules packet including one or more rules for selecting the one or more selective parts of the base document as one or more sources for content to be displayed through the second view. For instance, the rules packet election indication receiving module 102 of the computing device 10 of FIG. 1b receiving the indication 52 of the election of the rules packet 50', the elected rules packet 50' including one or more rules for selecting the one or more selective parts 61* of the base document 60* as one or more sources for content to be displayed through the second view 304*.

In the same or different implementations, the rules packet election indication receiving operation 402 of FIG. 4 may include an operation 516 for receiving the indication of the election of the rules packet, the elected rules packet including one or more rules for mapping to the one or more selective parts of the base document as further depicted in FIG. 5b. For instance, the rules packet election indication receiving module 102 of the computing device 10 of FIG. 1b receiving the indication 52 of the election of the rules packet 50', the elected rules packet 50' including one or more rules for mapping to the one or more selective parts 61* of the base document 60*.

Turning now to FIG. 5c, in various implementations, the base document 60 referred to in the rules packet election indication receiving operation 402 of FIG. 4 may be in reference to a variety of electronic documents. For example, in some implementations, the rules packet election indication receiving operation 402 of FIG. 4 may include an operation 517 for receiving the indication of the election of the rules packet, the elected rules packet including one or more rules for selecting one or more selective parts of a productivity application document for selective presentation. For instance, the rules packet election indication receiving module 102 of the computing device 10 of FIG. 1b receiving the indication 52 of the election of the rules packet 50', the elected rules packet 50' including one or more rules (e.g., directives or instructions) for selecting one or more selective parts 61* of a productivity application document for selective presentation.

As further illustrated in FIG. 5c, operation 517 may include one or more additional operations in various implementations. For example, in some implementations, operation 517 may include an operation 518 for receiving the indication of the election of the rules packet, the elected rules packet including one or more rules for selecting one or more selective parts of a word processing document for selective presentation. For instance, the rules packet election indication receiving module 102 of the computing device 10 of FIG. 1b receiving the indication 52 of the election of the rules packet 50', the elected rules packet 50' including one or more rules for selecting one or more selective parts 61* of a word processing document (e.g., base document 60') for selective presentation.

In the same or different implementations, operation 517 may include an operation 519 for receiving the indication of the election of the rules packet, the elected rules packet including one or more rules for selecting one or more selective parts of a spreadsheet document for selective presentation as further depicted in FIG. 5c. For instance, the rules packet election indication receiving module 102 of the computing device 10 of FIG. 1b receiving the indication 52 of the election of the rules packet 50', the elected rules packet 50' including one or more rules for selecting one or more selective parts of a spreadsheet document for selective presentation.

In the same or different implementations, operation 517 may include an operation 520 for receiving the indication of the election of the rules packet, the elected rules packet including one or more rules for selecting one or more selective parts of a presentation program document for selective presentation as further depicted in FIG. 5c. For instance, the rules packet election indication receiving module 102 of the computing device 10 of FIG. 1b receiving the indication 52 of the election of the rules packet 50', the elected rules packet 50' including one or more rules for selecting one or more selective parts of a presentation program document for selective presentation.

In some implementations, the rules packet election indication receiving operation 402 of FIG. 4 may include an operation 521 for receiving the indication of the election of the rules packet, the elected rules packet including one or more rules for selecting one or more selective parts of a social networking application document for selective presentation as further depicted in FIG. 5c. For instance, the rules packet election indication receiving module 102 of the computing device 10 of FIG. 1b receiving the indication 52 of the election of the rules packet 50', the elected rules packet 50' including one or more rules for selecting one or more selective parts of a social networking application document (e.g., a document, a message, or a posting generated using a social networking application such as a status report, a blog or a microblog, etc.) for selective presentation.

In some implementations, the rules packet election indication receiving operation 402 of FIG. 4 may include an operation 522 for receiving the indication of the election of the rules packet, the elected rules packet including one or more rules for selecting one or more selective parts of an email application document for selective presentation as depicted in FIG. 5c. For instance, the rules packet election indication receiving module 102 of the computing device 10 of FIG. 1b receiving the indication 52 of the election of the rules packet 50', the elected rules packet 50' including one or more rules for selecting one or more selective parts of an email application document (e.g., an email generated using an email application) for selective presentation.

Figure 6A:
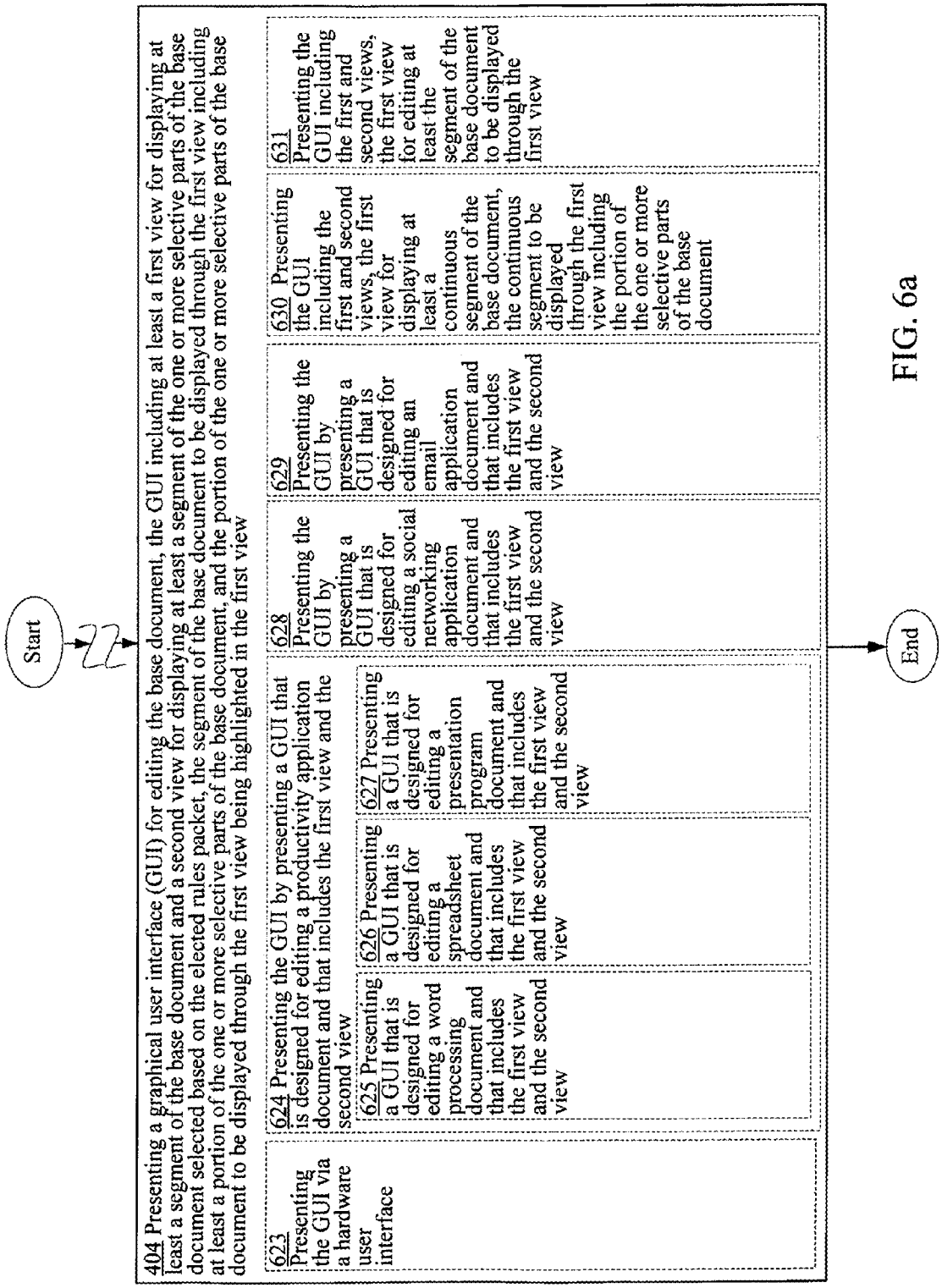
FIG. 6a is a high-level logic flowchart of a process depicting alternate implementations of the GUI presenting operation 404 of FIG. 4.

Referring back to the GUI presenting operation 404 of FIG. 4, the GUI presenting operation 404 similar to the rules packet election indication receiving operation 402 of FIG. 4 may be executed in a number of different ways in various alternative implementations as illustrated in FIGS. 6a, 6b, 6c, 6d, and 6e. For example, in some implementations, the GUI presenting operation 404 of FIG. 4 may include an operation 623 for presenting the GUI via a hardware user interface as depicted in FIG. 6a. For instance, the GUI presenting module 104 of the computing device 10 of FIG. 1b presenting the GUI 300* via a hardware user interface 106 (e.g., display monitor including a touch screen).

As further illustrated in FIG. 6a, the GUI presenting operation 404 may additionally or alternatively include an operation 624 for presenting the GUI by presenting a GUI that is designed for editing a productivity application document and that includes the first view and the second view in various alternative implementations. For instance, the GUI presenting module 104 of the computing device 10 of FIG. 1b presenting the GUI 300* by presenting a GUI 300* that is designed for editing (e.g., revising or authoring) a productivity application document and that includes the first view 302* and the second view 304*.

In some implementations, operation 624 may further include one or more additional operations including an operation 625 for presenting a GUI that is designed for editing a word processing document and that includes the first view and the second view as depicted in FIG. 6a. For instance, the GUI presenting module 104 of the computing device 10 of FIG. 1b presenting a GUI 300* that is designed for editing a word processing document (e.g., Microsoft Word document) and that includes the first view 302* and the second view 304*.

In the same or different implementations, operation 624 may additionally or alternatively include an operation 626 for presenting a GUI that is designed for editing a spreadsheet document and that includes the first view and the second view as further depicted in FIG. 6a. For instance, the GUI presenting module 104 of the computing device 10 of FIG. 1b presenting a GUI 300* that is designed for editing a spreadsheet document (e.g., Microsoft Excel document) and that includes the first view 302* and the second view 304*.

In the same or different implementations, operation 624 may include an operation 627 for presenting a GUI that is designed for editing a presentation program document and that includes the first view and the second view as depicted in FIG. 6a. For instance, the GUI presenting module 104 of the computing device 10 of FIG. 1b presenting a GUI 300* that is designed for editing a presentation program document (e.g., Microsoft PowerPoint document) and that includes the first view 302* and the second view 304*.

In the same or different implementations, the GUI presenting operation 404 of FIG. 4 may additionally or alternatively include an operation 628 for presenting the GUI by presenting a GUI that is designed for editing a social networking application document and that includes the first view and the second view as further depicted in FIG. 6a. For instance, the GUI presenting module 104 of the computing device 10 of FIG. 1b presenting the GUI 300* by presenting a GUI 300* that is designed for editing a social networking application document (e.g., a status report, a blog, a microblog, or other types of documents or files that may be generated or provided through a social networking application) and that includes the first view 302* and the second view 304*.

In the same or different implementations, the GUI presenting operation 404 of FIG. 4 may additionally or alternatively include an operation 629 for presenting the GUI by presenting a GUI that is designed for editing an email application document and that includes the first view and the second view as further depicted in FIG. 6a. For instance, the GUI presenting module 104 of the computing device 10 of FIG. 1b presenting the GUI 300* by presenting a GUI 300* that is designed for editing an email application document (e.g., an email) and that includes the first view 302* and the second view 304*.

In some implementations, the GUI presenting operation 404 of FIG. 4 may include an operation 630 for presenting the GUI including the first and second views, the first view for displaying at least a continuous segment of the base document, the continuous segment to be displayed through the first view including the portion of the one or more selective parts of the base document as further depicted in FIG. 6a. For instance, the GUI presenting module 104 including the first view presenting module 202 and the second view presenting module 204 of the computing device 10 of FIG. 1b presenting the GUI 300* including the first and second views 302* and 304*, the first view 302* as presented by the first view presenting module 202 for displaying at least a continuous segment 306* of the base document 60*, the continuous segment 306* to be displayed through the first view 302* including the portion of the one or more selective parts 61* of the base document 60*.

In the same or different implementations, the GUI presenting operation 404 of FIG. 4 may additionally or alternatively include an operation 631 for presenting the GUI including the first and second views, the first view for editing at least the segment of the base document to be displayed through the first view. For instance, the GUI presenting module 104 including the first view presenting module 202 and the second view presenting module 204 of the computing device 10 of FIG. 1b presenting the GUI 300* including the first and second views 302* and 304*, the first view 302* as presented by the first view presenting module 202 for editing (e.g., modifying or revising) at least the segment 306* of the base document 60* to be displayed through the first view 302*.

Figure 6B:
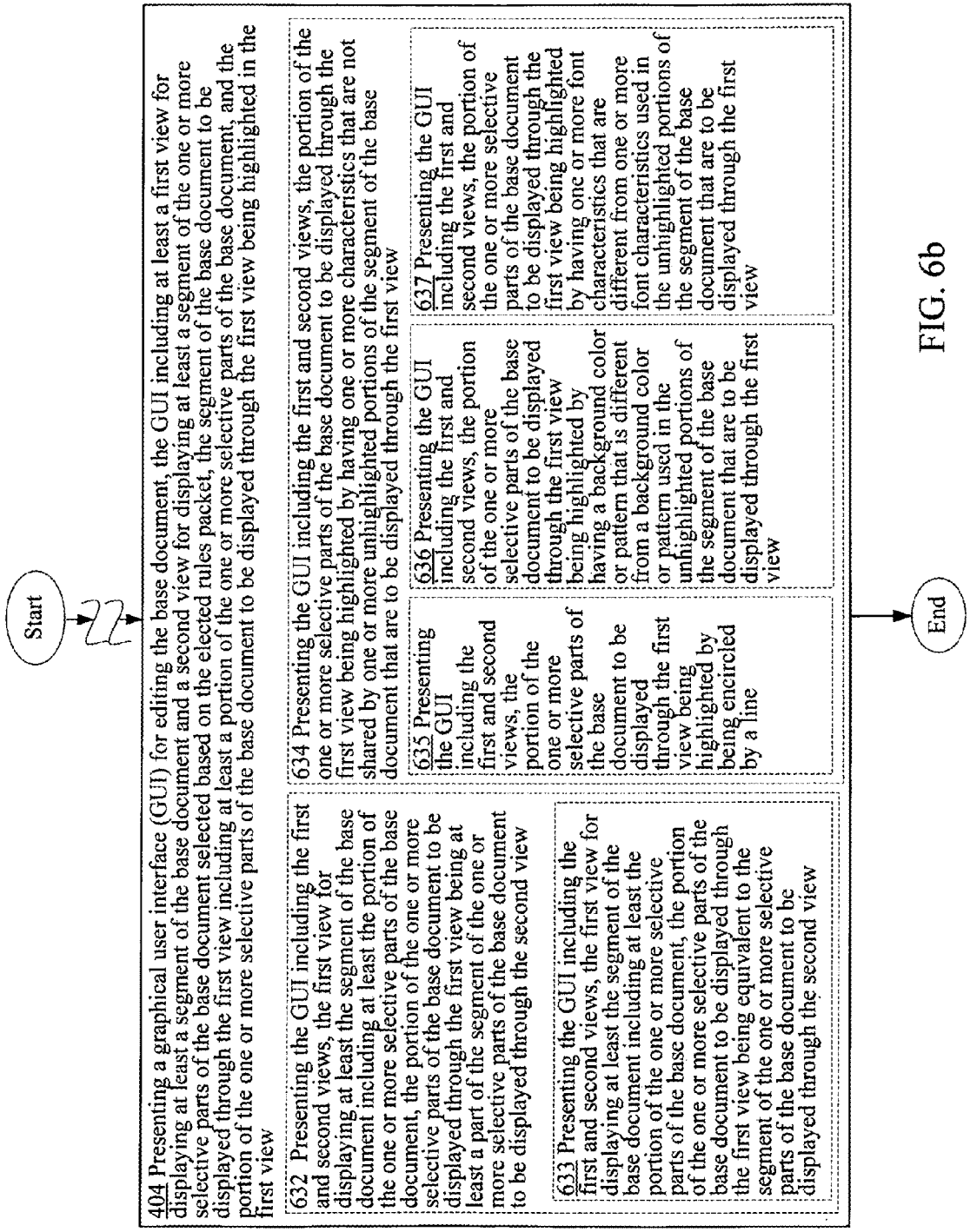
FIG. 6b is a high-level logic flowchart of a process depicting alternate implementations of the GUI presenting operation 404 of FIG. 4.

Turning now to FIG. 6b, in various implementations, the GUI presenting operation 404 of FIG. 4 may include an operation 632 for presenting the GUI including the first and second views, the first view for displaying at least the segment of the base document including at least the portion of the one or more selective parts of the base document, the portion of the one or more selective parts of the base document to be displayed through the first view being at least a part of the segment of the one or more selective parts of the base document to be displayed through the second view. For instance, the GUI presenting module 104 including the first view presenting module 202 and the second view presenting module 204 of the computing device 10 of FIG. 1b presenting the GUI 300* including the first and second views 302* and 304*, the first view 302* as presented by the first view presenting module 202 being designed for displaying at least the segment 306* of the base document 60* including at least the portion of the one or more selective parts 61* of the base document 60*, the portion of the one or more selective parts 61* of the base document 60* to be displayed through the first view 302* being at least a part of the segment 310* of the one or more selective parts 61* of the base document 60* to be displayed through the second view 304*.

In some implementations, operation 632 may further include an operation 633 for presenting the GUI including the first and second views, the first view for displaying at least the segment of the base document including at least the portion of the one or more selective parts of the base document, the portion of the one or more selective parts of the base document to be displayed through the first view being equivalent to the segment of the one or more selective parts of the base document to be displayed through the second view as further depicted in FIG. 6b. For instance, the GUI presenting module 104 including the first view presenting module 202 and the second view presenting module 204 of the computing device 10 of FIG. 1b presenting the GUI 300* including the first and second views 302* and 304*, the first view 302* as presented by the first view presenting module 202 for displaying at least the segment 306* of the base document 60* including at least the portion of the one or more selective parts 61* of the base document 60*, the portion of the one or more selective parts 61* of the base document 60* to be displayed through the first view 302* being equivalent to the segment 310* of the one or more selective parts 61* of the base document 60* to be displayed through the second view 304*. Note that in alternative implementations, the portion of the one or more selective parts 61* of the base document 60* to be presented through the first view 302* may not be equivalent to the segment 310* of the one or more selective parts 61* of the base document 60* being displayed through the second view 304*.

In various implementations, the portion of the one or more selective parts 61* of the base document 60* to be displayed through the first view 302* and to be highlighted in the first view in the GUI presenting operation 404 of FIG. 4 may be highlighted in a variety of different ways in various alternative implementations. For example, in some implementations, the GUI presenting operation 404 of FIG. 4 may include an operation 634 for presenting the GUI including the first and second views, the portion of the one or more selective parts of the base document to be displayed through the first view being highlighted by having one or more characteristics that are not shared by one or more unhighlighted portions of the segment of the base document that are to be displayed through the first view as further depicted in FIG. 6b. For instance, the GUI presenting module 104 including the highlighting module 206 (see FIG. 2a) of the computing device 10 of FIG. 1b presenting the GUI 300* including the first and second views 302* and 304*, the portion of the one or more selective parts 61* of the base document 60* to be displayed through the first view 302* being highlighted (e.g., emphasize, stress, underscore, and so forth) by the highlighting module 206 by having one or more characteristics that are not shared by one or more unhighlighted portions of the segment 306* of the base document 60* that are to be displayed through the first view 302*.

As further illustrated in FIG. 6b, operation 634 may further include one or more additional operations in various alternative implementations. For example, in some implementations, operation 634 may include an operation 635 for presenting the GUI including the first and second views, the portion of the one or more selective parts of the base document to be displayed through the first view being highlighted by being encircled by a line as depicted in FIG. 6b. For instance, the GUI presenting module 104 including the highlighting module 206 of the computing device 10 of FIG. 1b presenting the GUI 300b (see FIG. 3b) including the first and second views 302b and 304b, the portion of the one or more selective parts 61* of the base document 60' to be displayed through the first view 302b being highlighted by the highlighting module 206 by being encircled by one or more encircling lines 350 (see FIG. 3b).

In the same or different implementations, operation 634 may additionally or alternatively include an operation 636 for presenting the GUI including the first and second views, the portion of the one or more selective parts of the base document to be displayed through the first view being highlighted by having a background color or pattern that is different from a background color or pattern used in the unhighlighted portions of the segment of the base document that are to be displayed through the first view. For instance, the GUI presenting module 104 including the highlighting module 206 of the computing device 10 of FIG. 1b presenting the GUI 300c (see FIG. 3c) including the first and second views 302c and 304c, the portion of the one or more selective parts 61* of the base document 60' to be displayed through the first view 302c being highlighted by the highlighting module 206 by having a background color or pattern (see ref. 352 of FIG. 3c) that is different from a background color or pattern used in the unhighlighted portions of the segment 306' of the base document 60' that are to be displayed through the first view 302c.

In the same or different implementations, operation 634 may additionally or alternatively include an operation 637 for presenting the GUI including the first and second views, the portion of the one or more selective parts of the base document to be displayed through the first view being highlighted by having one or more font characteristics that are different from one or more font characteristics used in the unhighlighted portions of the segment of the base document that are to be displayed through the first view. For instance, the GUI presenting module 104 including the highlighting module 206 of the computing device 10 of FIG. 1b presenting the GUI 300d (see FIG. 3d) including the first and second views 302d and 304d, the portion of the one or more selective parts 61* of the base document 60' to be displayed through the first view 302d being highlighted by the highlighting module 206 by having one or more font characteristics (see ref 354 in FIG. 3d) that are different from one or more font characteristics used in the unhighlighted portions of the segment 306' of the base document 60' that are to be displayed through the first view 302d.

Figure 6C:
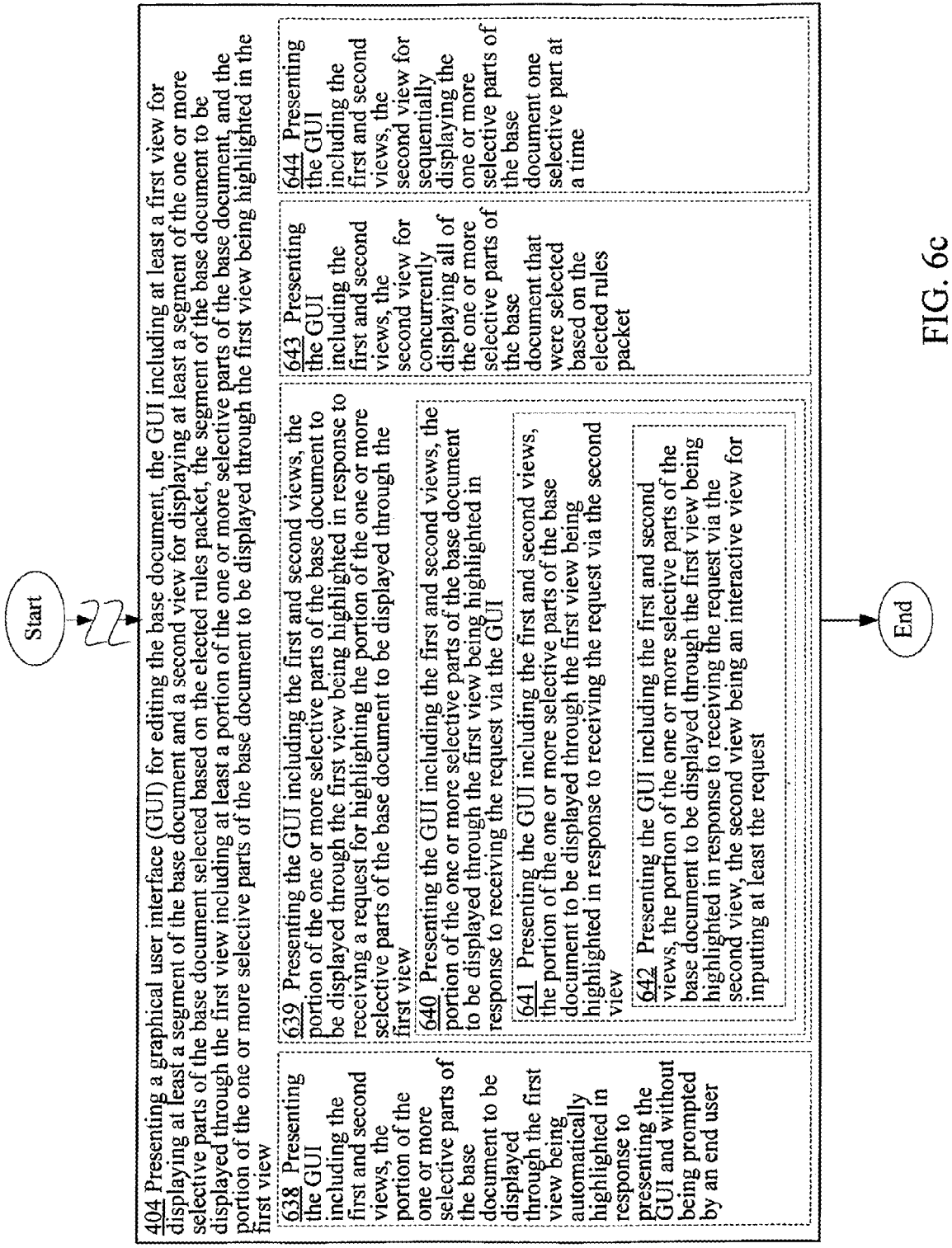
FIG. 6c is a high-level logic flowchart of a process depicting alternate implementations of the GUI presenting operation 404 of FIG. 4.

Referring now to FIG. 6c, in some implementations, the GUI presenting operation 404 of FIG. 4 may include an operation 638 for presenting the GUI including the first and second views, the portion of the one or more selective parts of the base document to be displayed through the first view being automatically highlighted in response to presenting the GUI and without being prompted by an end user. For instance, the GUI presenting module 104 including the automatic highlighting module 208 (see FIG. 2a) of the computing device 10 of FIG. 1b presenting the GUI 300* including the first and second views 302* and 304*, the portion of the one or more selective parts 61* of the base document 60* to be displayed through the first view 302* being automatically highlighted by the automatic highlighting module 208 in response to presenting the GUI 300* and without being prompted by an end user 32.

In alternative implementations, the GUI presenting operation 404 of FIG. 4 may include an operation 639 for presenting the GUI including the first and second views, the portion of the one or more selective parts of the base document to be displayed through the first view being highlighted in response to receiving a request for highlighting the portion of the one or more selective parts of the base document to be displayed through the first view as further depicted in FIG. 6c. For instance, the GUI presenting module 104 including the request responsive highlighting module 210 (see FIG. 2a) of the computing device 10 of FIG. 1b presenting the GUI 300* including the first and second views 302* and 304*, the portion of the one or more selective parts 61* of the base document 60* to be displayed through the first view 302* being highlighted by the request responsive highlighting module 210 in response to receiving a request (e.g., a request received from the end user 32 via hardware user interface 106) for highlighting the portion of the one or more selective parts 61* of the base document 60* to be displayed through the first view 302*.

As further illustrated in FIG. 6c, operation 639 may include one or more additional operations in various alternative implementations. For example, in some implementations, 639 may include an operation 640 for presenting the GUI including the first and second views, the portion of the one or more selective parts of the base document to be displayed through the first view being highlighted in response to receiving the request via the GUI. For instance, the GUI presenting module 104 including the request responsive highlighting module 210 of the computing device 10 of FIG. 1b presenting the GUI 300* including the first and second views 302* and 304*, the portion of the one or more selective parts 61* of the base document 60* to be displayed through the first view 302* being highlighted by the request responsive highlighting module 210 in response to receiving the request via the GUI 300* that may be displayed through, for example, a display interface 106a such as a touch screen. For example, the GUI 300* that may be presented may include a request button 340 in the first view 302*, the second view 304*(as shown in FIGS. 2b, 2c, and 2d), or in any other location on the GUI 300*, that may be tapped (if the GUI 300* is being displayed on a touch screen) or clicked on (if the GUI 300* is being display through a monitor/mouse/keyboard system) in order to submit a request for highlighting the portion of the one or more selective parts 61* of the base document 60* to be displayed through the first view 302*.

In some instances, operation 640 may further include an operation 641 for presenting the GUI including the first and second views, the portion of the one or more selective parts of the base document to be displayed through the first view being highlighted in response to receiving the request via the second view as further depicted in FIG. 6c. For example, the GUI presenting module 104 including the request responsive highlighting module 210 of the computing device 10 of FIG. 1b presenting the GUI 300* including the first and second views 302* and 304*, the portion of the one or more selective parts 61* of the base document 60* to be displayed through the first view 302* being highlighted by the request responsive highlighting module 210 in response to receiving the request via the second view 304* that may be displayed through, for example, a display interface 106a such as a touch screen.

In some cases, operation 641 may, in turn, further include an operation 642 for presenting the GUI including the first and second views, the portion of the one or more selective parts of the base document to be displayed through the first view being highlighted in response to receiving the request via the second view, the second view being an interactive view for inputting at least the request as further depicted in FIG. 6c. For instance, the GUI presenting module 104 including the request responsive highlighting module 210 of the computing device 10 of FIG. 1b presenting the GUI 300* including the first and second views 302* and 304*, the portion of the one or more selective parts 61* of the base document 60* to be displayed through the first view 302* being highlighted by the request responsive highlighting module 210 in response to receiving the request via the second view 304*, the second view 304* being an interactive view for inputting at least the request. For example, if the GUI 300* and the second view 304* is presented through a display interface 106a (e.g., a touch screen or a monitor/mouse/keyboard system), then the request for highlighting may be made by merely tapping (e.g., in the case of the second view 304* being displayed through a touch screen) or clicking (e.g., in the case of the second view 304* being displayed through a monitor/mouse/keyboard system) any part of the second view 304* or by tapping or clicking a request button 340 that may be disposed on the second view 304*.

As further illustrated in FIG. 6c, in some implementations, the GUI presenting operation 404 of FIG. 4 may include an operation 643 for presenting the GUI including the first and second views, the second view for concurrently displaying all of the one or more selective parts of the base document that were selected based on the elected rules packet. For instance, the GUI presenting module 104 including the first view presenting module 202 and the second view presenting module 204 of the computing device 10 of FIG. 1b presenting the GUI 300e (see FIG. 3e) including the first and second views 302e and 304e, the second view presenting module 204 presenting the second view 304e for concurrently displaying all of the one or more selective parts 61* of the base document 60' (e.g., selective parts 61', 61", and 61''' of the base document 60' as illustrated in FIG. 3a) that were selected based on the elected rules packet 50'.

In some implementations, the GUI presenting operation 404 of FIG. 4 may include an operation 644 for presenting the GUI including the first and second views, the second view for sequentially displaying the one or more selective parts of the base document one selective part at a time as further depicted in FIG. 6c. For instance, the GUI presenting module 104 including the first view presenting module 202 and the second view presenting module 204 of the computing device 10 of FIG. 1b presenting the GUI 300f (see FIG. 3D including the first and second views 302f and 304f, the second view presenting module 204 presenting the second view 304f for sequentially displaying the one or more selective parts 61* (e.g., selective parts 61', 61", and 61'''' of FIG. 3a) of the base document 60" one selective part 61*at a time (e.g., by employing the scrolling feature.

Figure 6D:
FIG. 6d is a high-level logic flowchart of a process depicting alternate implementations of the GUI presenting operation 404 of FIG. 4.

Turning now to FIG. 6d, in some implementations, the GUI presenting operation 404 of FIG. 4 may include an operation 645 for presenting the GUI including the first and second views, the second view for displaying at least a segment of two or more selective parts selected from the base document including displaying at least a segment of two or more discontinuous selective parts of the base document selected based on the elected rules packet. For instance, the GUI presenting module 104 including the first view presenting module 202 and the second view presenting module 204 of the computing device 10 of FIG. 1b presenting the GUI 300b (see FIG. 3b) including the first and second views 302b and 304b, the second view presenting module 204 presenting the second view 304b for displaying at least a segment 310' of two or more selective parts 61' and 61" selected from the base document 60' including displaying at least a segment 310' of two or more discontinuous selective parts 61' and 61" (e.g., selective parts 61' and 61" of the base document 60' that are at least not adjacent to each other) of the base document 60' selected based on the elected rules packet 50'.

In some instances, operation 645 may further include an operation 646 for presenting the GUI including the first and second views, the second view for concurrently displaying two or more of the discontinuous selective parts of the base document as further depicted in FIG. 6d. For instance, the GUI presenting module 104 including the first view presenting module 202 and the second view presenting module 204 of the computing device 10 of FIG. 1b presenting the GUI 300b (see FIG. 3b) including the first and second views 302b and 304b, the second view presenting module 204 presenting the second view 304b for concurrently displaying two or more of the discontinuous selective parts 61' and 61" of the base document 60' as depicted in, for example, FIG. 3b.

In the same or different implementations, the GUI presenting operation 404 of FIG. 4 may include an operation 647 for presenting the GUI including the first and second views, the second view for displaying one or more interpretive versions of at least the selective parts of the base document that were selected based on the elected rules packet as further depicted in FIG. 6d. For instance, the GUI presenting module 104 including the first view presenting module 202 and the second view presenting module 204 of the computing device 10 of FIG. 1b presenting the GUI 300g including the first and second views 302g and 304g, the second view presenting module 204 presenting the second view 304g for displaying one or more interpretive versions (e.g., semantically equivalent versions) of at least the selective parts 61' and 61" of a base document 60' that were selected (and/or interpreted) based on the elected rules packet 50'. There are numerous ways to interpret a base document 60* depending upon a number of factors including, for example, what is being interpreted (e.g., is textual or numerical content being interpreted?) and the goals of the interpretation (e.g., to summarize or condense, or to provide a semantically equivalent). And since an attempt to address all of the different ways to interpret a base document 60* or a portion of the base document 60* may be beyond the scope of this description, the specifics on how a base document 60* or a portion of a base document 60* might be interpreted will herein be limited.

In some implementations, operation 647 may include an operation 648 for presenting the GUI including the first and second views, the second view for displaying one or more summarized versions of at least the selective parts of the base document that were selected based on the elected rules packet. For instance, the GUI presenting module 104 including the first view presenting module 202 and the second view presenting module 204 of the computing device 10 of FIG. 1b presenting the GUI 300g including the first and second views 302g and 304g, the second view presenting module 204 presenting the second view 304g for displaying one or more summarized versions (e.g., shorten or condensed versions) of at least the selective parts 61' and 61" of the base document 60' that were selected based on the elected rules packet 50'.

In the same or different implementations, the GUI presenting operation 404 of FIG. 4 may include an operation 649 for presenting the GUI including the first and second views, the second view including a scrolling feature to display through the second view different segments of the one or more selective parts of the base document selected based on the elected rules packet as further depicted in FIG. 6d. For instance, the GUI presenting module 104 including the first view presenting module 202 and the second view presenting module 204 of the computing device 10 of FIG. 1b presenting the GUI 300b (see FIG. 3b) including the first and second views 302b and 304b, the second view presenting module 204 presenting the second view 304b including a scrolling feature 320 to display through the second view 304b different segments of the one or more selective parts 61* of the base document 60' selected based on the elected rules packet 50'.

In various implementations, the second view provided through the GUI presenting operation 404 of FIG. 4 may be an interactive view that may facilitate an end user 32 in controlling what is displayed through the GUI 300*. For example, in some implementations, the GUI presenting operation 404 of FIG. 4 may include an operation 650 for presenting the GUI including the first and second views, the second view being an interactive view designed for controlling which segment of the base document is to be displayed through the first view as depicted in FIG. 6d. For instance, the GUI presenting module 104 including the first view presenting module 202 and the second view presenting module 204 of the computing device 10 of FIG. 1b presenting the GUI 300* including the first and second views 302* and 304*, the second view 304* to be presented by the second view presenting module 204 being an interactive view (e.g., an interactive window displayed through, for example, a touch screen or a display monitor of a monitor/mouse/keyboard system) designed for controlling which segment of the base document 60* is to be displayed through the first view 302*. For example, and referring to FIG. 3b, if the second view 304* is being displayed on a touch screen, and the end user 32 taps on the second view 304* that is displaying a selective part 61' of the base document 60', then the computing device 10 may respond to the tapping of the second view 304* by displaying through the first view 302* a segment 306' of the base document 60' that includes the selective part 61' of the base document 60' in order to show to the end user 32 which part of the base document 60' was the source for the selective part 61' being displayed through the second view 304*.

As further illustrated in FIG. 6d, operation 650 may, in some implementations, include an operation 651 for presenting the GUI including the first and second views, the second view being an interactive view designed to facilitate an end user to input a selection of at least one of the one or more selective parts of the base document to be displayed through the second view, and the first view being designed to display, in response to the selection made by the end user, at least a segment of the base document that includes at least one of the one or more selective parts of the base document selected by the end user as further depicted in FIG. 6d. For instance, the GUI presenting module 104 including the first view presenting module 202 and the second view presenting module 204 of the computing device 10 of FIG. 1b presenting the GUI 300* including the first and second views 302* and 304*, the second view 304* to be presented by the second view presenting module 204 being an interactive view designed to facilitate an end user 32 to input a selection of at least one of the one or more selective parts 61* of the base document 60* to be displayed through the second view 304*, and the first view 302* as presented by the first view presenting module 202 being designed to display, in response to the selection made by the end user 32, at least a segment 306* of the base document 60* that includes at least one of the one or more selective parts 61* of the base document 60* selected by the end user 32.

In some cases, operation 651 may, in turn, include an operation 652 for presenting the GUI including the first and second views, the first view being designed to display, in response to the selection made by the end user, at least a segment of the base document that includes at least one of the one or more selective parts of the base document selected by the end user, the at least one of the one or more selective parts of the base document to be displayed through the first view being highlighted in the first view. For instance, the GUI presenting module 104 including the first view presenting module 202 and the second view presenting module 204 of the computing device 10 of FIG. 1b presenting the GUI 300* including the first and second views 302* and 304*, the first view 302* to be presented by the first view presenting module 202 being designed to display, in response to the selection made by the end user 32, at least a segment 306* of the base document 60* that includes at least one of the one or more selective parts 61* of the base document 60* selected by the end user 32, the at least one of the one or more selective parts 61* of the base document 60* to be displayed through the first view 302* being highlighted in the first view 302* by, for example, the highlighting module 206 of the computing device 10.

Figure 6E:
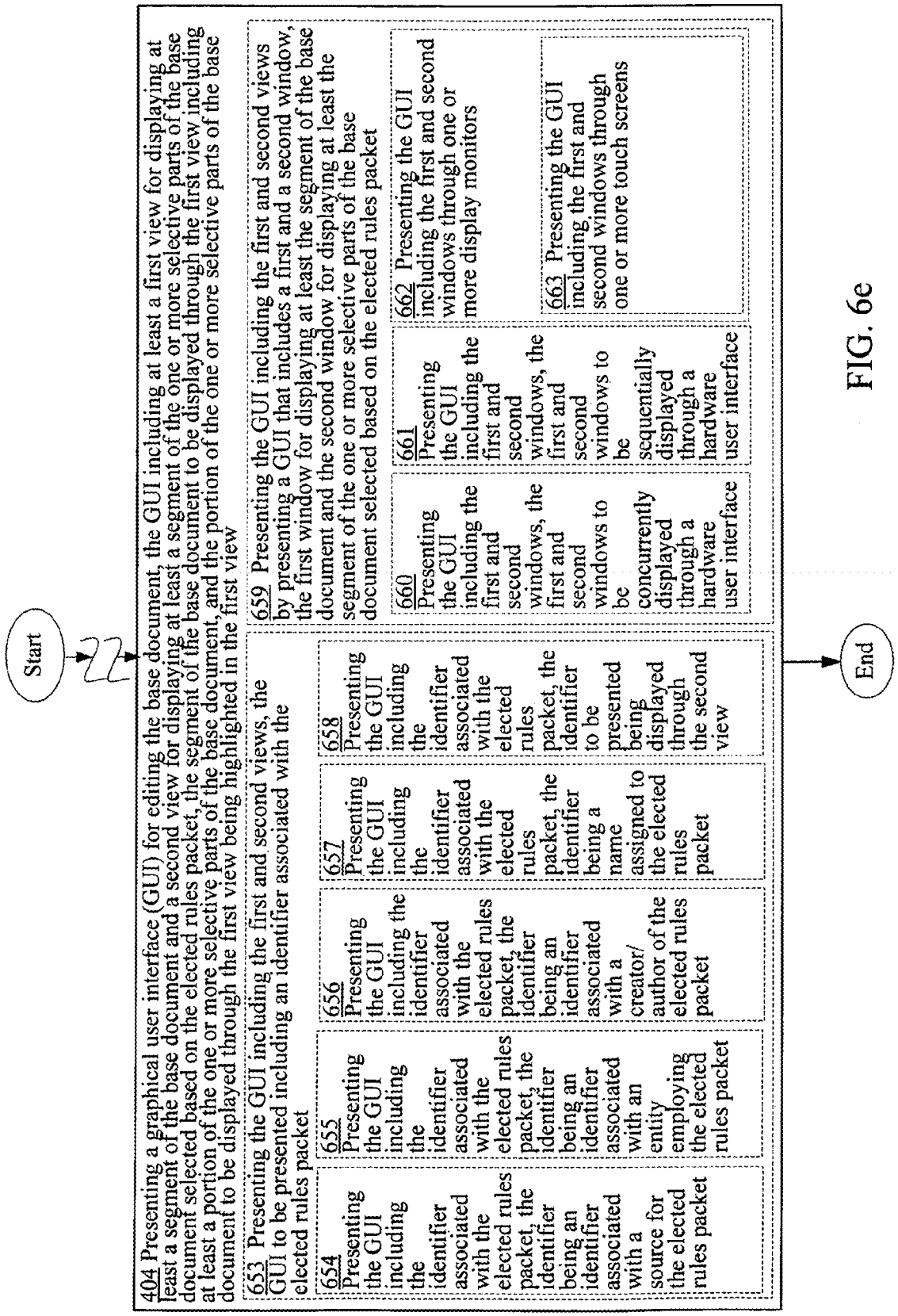
FIG. 6e is a high-level logic flowchart of a process depicting alternate implementations of the GUI presenting operation 404 of FIG. 4.

Turning now to FIG. 6e, in various implementations, the GUI presenting operation 404 of FIG. 4 may include an operation 653 for presenting the GUI including the first and second views, the GUI to be presented including an identifier associated with the elected rules packet. For instance, the GUI presenting module 104 including the identifier presenting module 212 (see FIG. 2a) of the computing device 10 of FIG. 1b presenting the GUI 300* including the first and second views 302* and 304*, the GUI 300* to be presented including an identifier 360*(e.g., a representation such as a name—see, for example, FIGS. 3b, 3c, and 3d) that is presented by the identifier presenting module 212 and that is associated with the elected rules packet 50'.

As further illustrated in FIG. 6e, operation 653 may include one or more additional operations in various implementations. For example, in some implementations, operation 653 may include an operation 654 for presenting the GUI including the identifier associated with the elected rules packet, the identifier being an identifier associated with a source for the elected rules packet. For instance, the GUI presenting module 104 including the identifier presenting module 212 of the computing device 10 of FIG. 1b presenting the GUI 300* including the identifier 360*(see, for example, FIGS. 3b, 3c, and 3d) that is associated with the elected rules packet 50' and presented by the identifier presenting module 212, the identifier 360* being an identifier 360* associated with a source (e.g., a potential recipient 22) for the elected rules packet 50'.

In the same or different implementations, operation 653 may additionally or alternatively include an operation 655 for presenting the GUI including the identifier associated with the elected rules packet, the identifier being an identifier associated with an entity employing the elected rules packet. For instance, the GUI presenting module 104 including the identifier presenting module 212 of the computing device 10 of FIG. 1b presenting the GUI 300* including the identifier 360* associated with the elected rules packet 50', the identifier 360* as presented by the identifier presenting module 212 being an identifier 360* associated with an entity (e.g., potential recipient 22, which may be a person, a group, a business, or a website such as social networking website) employing the elected rules packet 50'.

In the same or different implementations, operation 653 may additionally or alternatively include an operation 656 for presenting the GUI including the identifier associated with the elected rules packet, the identifier being an identifier associated with a creator/author of the elected rules packet. For instance, the GUI presenting module 104 including the identifier presenting module 212 of the computing device 10 of FIG. 1b presenting the GUI 300* including the identifier 360* associated with the elected rules packet 50', the identifier 360* as presented by the identifier presenting module 212 being an identifier 360* associated with a creator/author of the elected rules packet 50'.

In the same or different implementations, operation 653 may additionally or alternatively include an operation 657 for presenting the GUI including the identifier associated with the elected rules packet, the identifier being a name assigned to the elected rules packet. For instance, the GUI presenting module 104 including the identifier presenting module 212 of the computing device 10 of FIG. 1b presenting the GUI 300* including the identifier 360* associated with the elected rules packet 50', the identifier 360* being a name assigned to the elected rules packet 50'.

In the same or different implementations, operation 653 may additionally or alternatively include an operation 658 for presenting the GUI including the identifier associated with the elected rules packet, the identifier to be presented being displayed through the second view. For instance, the GUI presenting module 104 including the identifier presenting module 212 of the computing device 10 of FIG. 1b presenting the GUI 300* including the identifier 360* associated with the elected rules packet 50', the identifier 360* to be presented by the identifier presenting module 212 being displayed through the second view 304*. Note that although the identifiers 360*(e.g., identifiers 360b, 360c, and 360d) illustrated in FIGS. 3b, 3c, and 3d are depicted as being displayed through the second view 304*, in alternative implementations, however, an identifier 360* may be presented through other portions of the GUI 300*.

In various implementations, the GUI presenting operation 404 of FIG. 4 may include an operation 659 for presenting the GUI including the first and second views by presenting a GUI that includes a first and a second window, the first window for displaying at least the segment of the base document and the second window for displaying at least the segment of the one or more selective parts of the base document selected based on the elected rules packet as further depicted in FIG. 6e. For instance, the GUI presenting module 104 including the first window presenting module 220 and the second window presenting module 222 (see FIG. 2a) of the computing device 10 of FIG. 1b presenting the GUI 300* including the first and second views 302* and 304* by presenting a GUI 300* that includes a first and a second window, the first window (e.g., first view 302*) to be presented by the first window presenting module 220 for displaying at least the segment 306* of the base document 60* and the second window (e.g., second view 304*) to be presented by the second window presenting module 222 for displaying at least the segment 310* of the one or more selective parts 61* of the base document 60* selected based on the elected rules packet 50'.

As further illustrated in FIG. 6e, in various implementations, operation 659 may include one or more additional operations. For example, in some implementations, operation 659 may include an operation 660 for presenting the GUI including the first and second windows, the first and second windows to be concurrently displayed through a hardware user interface. For instance, the GUI presenting module 104 including the first window presenting module 220 and the second window presenting module 222 of the computing device 10 of FIG. 1b presenting the GUI 300* including the first and second windows (e.g., the first and second views 302* and 304*), the first and second windows to be presented by the first window presenting module 220 and the second window presenting module 222 being concurrently displayed (e.g., as illustrated in FIGS. 3b, 3c, 3d, 3e, 3f, 3g, and 3h) through a hardware user interface 106 (e.g., a display monitor such as a touch screen) by the first window presenting module 220 and the second window presenting module 222.

In the same or different implementations, operation 659 may include an operation 661 for presenting the GUI including the first and second windows, the first and second windows to be sequentially displayed through a hardware user interface. For instance, the GUI presenting module 104 including the first window presenting module 220 and the second window presenting module 222 of the computing device 10 of FIG. 1b presenting the GUI 300* including the first and second windows (e.g., the first and second views 302* and 304*), the first and second windows to be presented by the first window presenting module 220 and the second window presenting module 222 being sequentially displayed through a hardware user interface 106 by the first window presenting module 220 and the second window presenting module 222. That is, and although not specifically illustrated in FIGS. 3b, 3c, 3d, 3e, 3f, 3g, and 3h, in some alternative implementations, each of the first and second windows (e.g., the first and second views 302* and 304*) may be sequentially displayed through the hardware user interface 106 one window at a time. This may be the case when, for example, the hardware user interface 106 is a relatively small display (e.g., a display monitor including a touch screen) such as in the case when the computing device 10 is a portable device such as a Smartphone, which typically has a relatively small form factor.

In the same or different implementations, operation 659 may include an operation 662 for presenting the GUI including the first and second windows through one or more display monitors. For instance, the GUI presenting module 104 including the first window presenting module 220 and the second window presenting module 222 of the computing device 10 of FIG. 1b presenting the GUI 300* including the first and second windows (e.g., the first and second views 302* and 304*), the first and second windows to be presented by the first window presenting module 220 and the second window presenting module 222 through one or more display monitors.

As further illustrated in FIG. 6e, operation 662 may, in some implementations, include an operation 663 for presenting the GUI including the first and second windows through one or more touch screens. For instance, the GUI presenting module 104 including the first window presenting module 220 and the second window presenting module 222 of the computing device 10 of FIG. 1b presenting the GUI 300* including the first and second windows (e.g., the first and second views 302* and 304*) through one or more touch screens.

Figure 7:
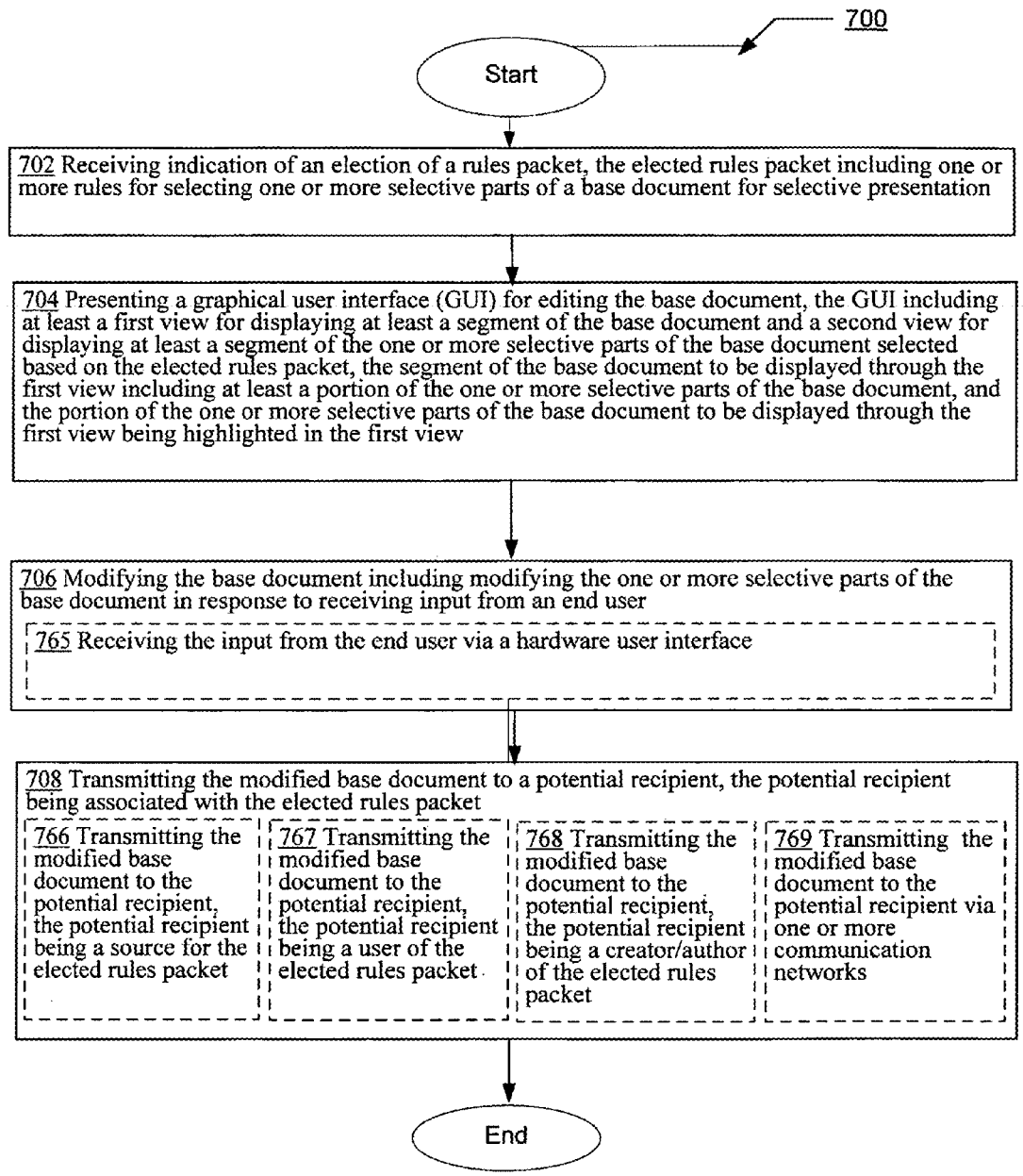
FIG. 7 is another high-level logic flowchart of another process.

Referring to FIG. 7 illustrating another operational flow 700 in accordance with various embodiments. Operational flow 700 includes certain operations that mirror the operations included in operational flow 400 of FIG. 4. These operations include a rules packet election indication receiving operation 702 and a GUI presenting operation 704 that corresponds to and mirror the rules packet election indication receiving operation 402 and the GUI presenting operation 404, respectively, of FIG. 4.

In addition, operational flow 700 may include an operation 706 for modifying the base document including modifying the one or more selective parts of the base document in response to receiving input from an end user and an operation 708 for transmitting the modified base document to a potential recipient, the potential recipient being associated with the elected rules packet. For example, the base document modifying module 120 of the computing device 10 of FIG. 1b modifying the base document 60* including modifying the one or more selective parts 61*of the base document 60* in response to receiving input from an end user 32 (e.g., end user 32 providing editing/authoring input via the hardware user interface 106), and the modified base document transmitting module 122 (see FIG. 1b) of the computing device 10 transmitting (e.g., via one or more communication networks 40) the modified base document 62 to a potential recipient 22, the potential recipient 22 being associated with the elected rules packet 50'. In some implementations, such operations may allow the end user 32 to modify the one or more selective parts 61*of the base document 60* in order to ensure that the view of the base document 60* to be displayed to a potential recipient 22 (who is employing the elected rules packet 50') will include information that the end user 32 deems important or at least believed by the end user 32 as being relevant to the potential recipient 22. In other words, such operations allows the end user 32 to control what a potential recipient 22 may actually see when reviewing, for example, the condensed or summarized versions of the base document 60* based on the rules packet 50'.

As illustrated in FIG. 7, in some implementations, operation 706 may include an operation 765 for receiving the input from the end user via a hardware user interface. For instance, the input receiving module 250 (see FIG. 1b) of the computing device 10 receiving the input from the end user 32 via a hardware user interface 106 (e.g., touch screen, mouse, keypad or keyboard, microphone, and so forth).

In the same or different implementations, operation 708 may include an operation 766 for transmitting the modified base document to the potential recipient, the potential recipient being a source for the elected rules packet as further depicted in FIG. 7. For instance, the modified base document transmitting module 122 (see FIG. 1b) of the computing device 10 transmitting the modified base document 62 to the potential recipient 22, the potential recipient 22 being a source for the elected rules packet 50'.

In the same or different implementations, operation 708 may include an operation 767 for transmitting the modified base document to the potential recipient, the potential recipient being a user of the elected rules packet. For instance, the modified base document transmitting module 122 of the computing device 10 transmitting the modified base document 62 to the potential recipient 22, the potential recipient 22 being a user of the elected rules packet 50' (e.g., an entity employing the elected rules packet 50' in order to interpret or summarize the base document 60*).

In the same or different implementations, operation 708 may include an operation 768 for transmitting the modified base document to the potential recipient, the potential recipient being a creator/author of the elected rules packet. For instance, the modified base document transmitting module 122 of the computing device 10 transmitting the modified base document 62 to the potential recipient 22, the potential recipient 22 being a creator/author of the elected rules packet 50'.

In the same or different implementations, operation 708 may include an operation 769 for transmitting the modified base document to the potential recipient via one or more communication networks. For instance, the modified base document transmitting module 122 of the computing device 10 transmitting the modified base document 62 to the potential recipient 22 via one or more communication networks 40 (e.g., LAN, WLAN, WiMAX, WMAN, PTSN, and so forth).

Figure 8:
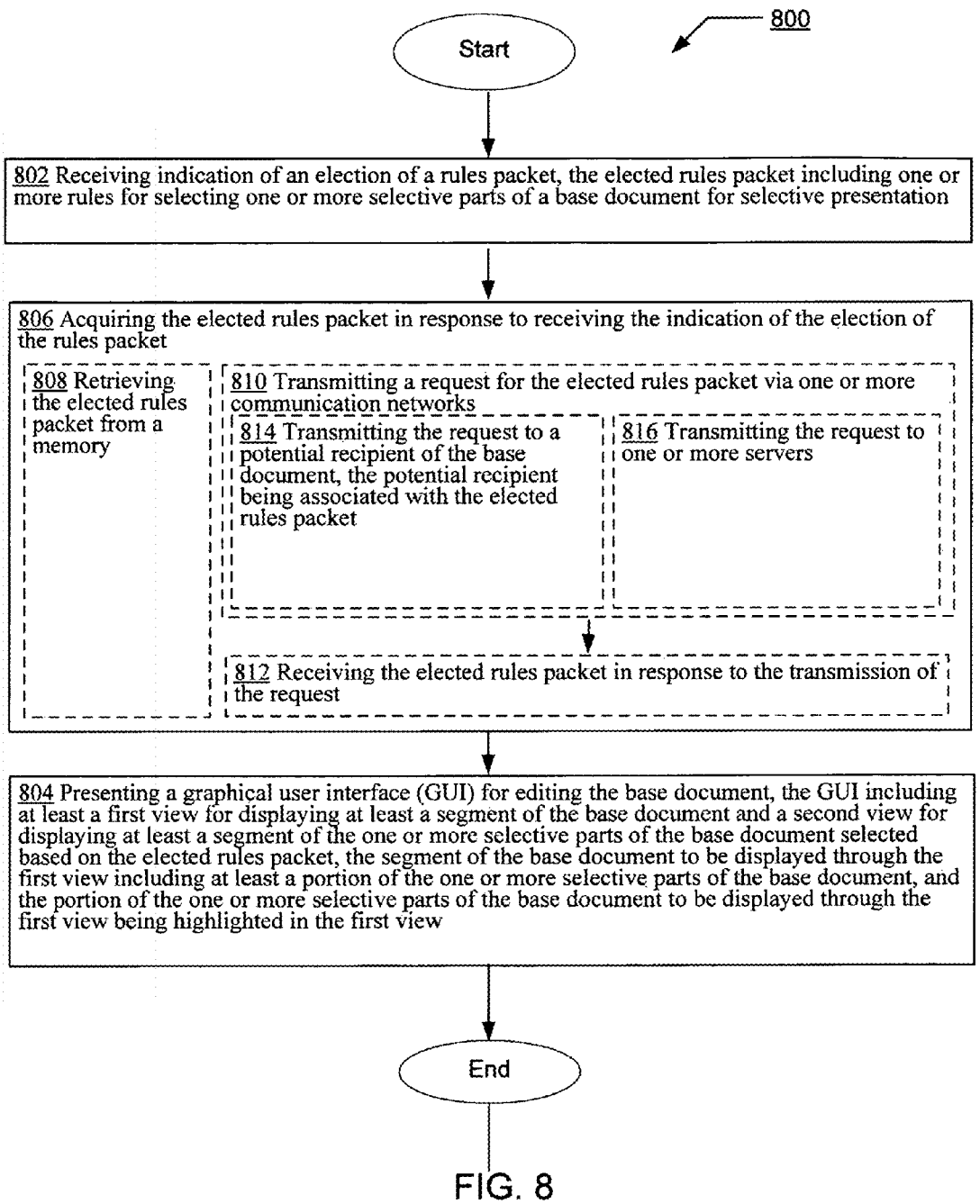
FIG. 8 is another high-level logic flowchart of another process.

Referring to FIG. 8 illustrating another operational flow 800 in accordance with various embodiments. Operational flow 800 includes certain operations that mirror the operations included in operational flow 400 of FIG. 4. These operations include a rules packet election indication receiving operation 802 and a GUI presenting operation 804 that corresponds to and mirror the rules packet election indication receiving operation 402 and the GUI presenting operation 404, respectively, of FIG. 4.

In addition, operational flow 800 may include an operation 806 for acquiring the elected rules packet in response to receiving the indication of the election of the rules packet as further depicted in FIG. 8. For instance, the elected rules packet acquiring module 130 (see FIG. 1b) of the computing device 10 acquiring (e.g., retrieving or soliciting from a memory 140 or from a network cloud) the elected rules packet 50' in response to receiving the indication 52 of the election of the rules packet 50'.

As further illustrated in FIG. 8, operation 806 may include one or more additional operations in various alternative implementations. For example, in some cases operation 806 may include an operation 808 for retrieving the elected rules packet from a memory. For instance, the memory retrieving module 260 (see FIG. 2b) of the computing device 10 retrieving the elected rules packet 50' from a memory 140 (e.g., volatile and/or non-volatile memory).

In some implementations, operation 806 may additionally or alternatively include an operation 810 for transmitting a request for the elected rules packet via one or more communication networks and an operation 812 for receiving the elected rules packet in response to the transmission of the request as further depicted in FIG. 8. For instance, the request transmitting module 262 (see FIG. 2b) of the computing device 10 of FIG. 1b transmitting a request 66 (e.g., a solicitation) for the elected rules packet 50' via one or more communication networks 40 and the elected rules packet receiving module 264 receiving the elected rules packet 50' in response to the transmission of the request 66.

As further illustrated in FIG. 8, operation 810 for transmitting a request for the elected rules packet via one or more communication networks may include one or more additional operations. For example, in some implementations, operation 810 may include an operation 814 for transmitting the request to a potential recipient of the base document, the potential recipient being associated with the elected rules packet. For instance, the request transmitting module 262 of the computing device 10 transmitting the request 66 to a potential recipient 22 of the base document 60*, the potential recipient 22 being associated with the elected rules packet 50'.

In the same or alternative implementations, operation 810 may include an operation 816 for transmitting the request to one or more servers as further depicted in FIG. 8. For instance, the request transmitting module 262 of the computing device 10 transmitting the request 66 to one or more servers 30.

Turning now to FIG. 9, which is a high-level block diagram illustrating another implementation of the computing device 10 of FIG. 1b. As illustrated, the computing device 10 may include one or more processors 902 (e.g., one or more microprocessors, one or more controllers, and so forth), a storage medium 906 (e.g., volatile and/or non-volatile memory), a hardware user interface 106, and a network interface 108, coupled together as shown. The storage medium 906 may store computer readable instructions 904 (e.g., computer program product). The one or more processors 902, in various implementations, may execute the computer readable instructions 904 in order to execute one or more operations described above and as illustrated in, for example, FIGS. 4, 5a, 5b, 5c, 6a, 6b, 6c, 6d, 6e, 7, and 8. From another perspective, FIG. 9 illustrates an implementation of the computing device 10 in which the various logic modules of the computing device 10 of FIG. 1b including the rules packet election indication receiving module 102, the GUI presenting module 104, the base document modifying module 120, the modified base document transmitting module 122, the elected rules packet acquiring module 130, and their sub-modules (e.g., as illustrated in FIGS. 1b, 2a, and 2b) of the computing device 10 may be implemented by the one or more processors 902 executing software (e.g., depicted as computer readable instructions 904 in FIG. 9) that may be stored in a memory (e.g., depicted as storage medium 906 in FIG. 9).

For example, the processor 902 may execute the computer readable instructions 904 in order receive indication 52 of an election of a rules packet 50', the elected rules packet 50' including one or more rules for selecting one or more selective parts 61* of a base document 60* for selective presentation, and to present a graphical user interface (GUI) 300* for editing the base document 60*, the GUI 300* including at least a first view 302* for displaying at least a segment 306* of the base document 60* and a second view 304* for displaying at least a segment 310* of the one or more selective parts 61* of the base document 60* selected based on the elected rules packet 50', the segment 306* of the base document 60* to be displayed through the first view 302* including at least a portion of the one or more selective parts 61* of the base document 60*, and the portion of the one or more selective parts 61* of the base document 60* to be displayed through the first view 302* being highlighted in the first view 302 as illustrated by the operational flow 400 of FIG. 4.

Those having skill in the art will recognize that the state of the art has progressed to the point where there is little distinction left between hardware and software implementations of aspects of systems; the use of hardware or software is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuitry (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuitry, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

In a general sense, those skilled in the art will recognize that the various aspects described herein which can be implemented, individually and/or collectively, by a wide range of hardware, software, firmware, or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of random access memory), and/or electrical circuitry forming a communications device (e.g., a modem, communications switch, or optical-electrical equipment). Those having skill in the art will recognize that the subject matter described herein may be implemented in an analog or digital fashion or some combination thereof.

Those having skill in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. Furthermore, it is to be understood that the invention is defined by the appended claims.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.).

In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

What is claimed is:

1. A computationally-implemented method, comprising:
receiving indication of an election of a rules packet, the elected rules packet including one or more rules for selecting one or more selective parts of a base document for selective presentation, including at least:
receiving the indication of the election of the rules packet by receiving the indication of the election of the rules packet elected from a plurality of rules packets, at least one of the plurality of rules packets that the elected rules packet is elected from being associated with one or more particular communication channels; and
presenting a graphical user interface (GUI) for editing the base document, the GUI including at least a first view for displaying at least a segment of the base document and a second view for displaying at least a segment of the one or more selective parts of the base document selected based on the elected rules packet, the segment of the base document to be displayed through the first view including at least a portion of the one or more selective parts of the base document, and the portion of the one or more selective parts of the base document to be displayed through the first view being highlighted in the first view; and
wherein at least one of the receiving or the presenting is performed at least in part with one or more processing devices.

2. A computer program product, comprising:
one or more non-transitory computer readable media, including at least:
one of more instructions for receiving indication of an election of a rules packet, the elected rules packet including one or more rules for selecting one or more selective parts of a base document for selective presentation, including at least:
one or more instructions for receiving the indication of the election of the rules packet by receiving the indication of the rules packet elected from a plurality of rules packets, at least one of the plurality of rules packets that the elected rules packet is elected from being associated with one or more particular communication channels; and
one or more instructions for presenting a graphical user interface (GUI) for editing the base document, the GUI including at least a first view for displaying at least a segment of the base document and a second view for displaying at least a segment of the one or more selective parts of the base document selected based on the elected rules packet, the segment of the base document to be displayed through the first view including at least a portion of the one or more selective parts of the base document, and the portion of the one or more selective parts of the base document to be displayed through the first view being highlighted in the first view.

3. The computer program product of claim 2, wherein said one or more instructions for receiving the indication of the election of the rules packet by receiving the indication of the rules packet elected from a plurality of rules packets comprises:
one or more instructions for receiving the indication of the election of the rules packet elected from the plurality of rules packets, the elected rules packet being associated with one or more potential recipients of the base document and at least one non-elected rules packet of the plurality of rules packets being associated with one more other potential recipients of the base document, wherein at least one of the one or more potential recipients associated with the elected rules packet is a particular person.

4. The computer program product of claim 3, wherein said one or more instructions for receiving the indication of the election of the rules packet elected from the plurality of rules packets, the elected rules packet being associated with one or more potential recipients of the base document and at least one non-elected rules packet of the plurality of rules packets being associated with one more other potential recipients of the base document, wherein at least one of the one or more potential recipients associated with the elected rules packet is a particular person comprises:
one or more instructions for receiving the indication of the election of the rules packet from the plurality of rules packets, the elected rules packet having been originally provided by the one or more potential recipients of the base document and the at least one non-elected rules packet having been originally provided by the one more other potential recipients of the base document.

5. The computer program product of claim 2, wherein said one or more instructions for receiving indication of an election of a rules packet, the elected rules packet including one or more rules for selecting one or more selective parts of a base document for selective presentation comprises:
one or more instructions for receiving the indication of the election of the rules packet, the elected rules packet being associated with a potential recipient of the base document.

6. The computer program product of claim 5, wherein said one or more instructions for receiving the indication of the election of the rules packet, the elected rules packet being associated with a potential recipient of the base document comprises:

one or more instructions for receiving the indication of the election of the rules packet, the elected rules packet being at least originally provided by the potential recipient.

7. The computer program product of claim 5, wherein said one or more instructions for receiving the indication of the election of the rules packet, the elected rules packet being associated with a potential recipient of the base document comprises:
one or more instructions for receiving the indication of the election of the rules packet, the elected rules packet being at least partly created by the potential recipient.

8. The computer program product of claim 2, wherein said one or more instructions for presenting a graphical user interface (GUI) for editing the base document, the GUI including at least a first view for displaying at least a segment of the base document and a second view for displaying at least a segment of the one or more selective parts of the base document selected based on the elected rules packet, the segment of the base document to be displayed through the first view including at least a portion of the one or more selective parts of the base document, and the portion of the one or more selective parts of the base document to be displayed through the first view being highlighted in the first view comprises:
one or more instructions for presenting the GUI including the first and second views, the first view for displaying at least a continuous segment of the base document, the continuous segment to be displayed through the first view including the portion of the one or more selective parts of the base document.

9. The computer program product of claim 2, wherein said one or more instructions for presenting a graphical user interface (GUI) for editing the base document, the GUI including at least a first view for displaying at least a segment of the base document and a second view for displaying at least a segment of the one or more selective parts of the base document selected based on the elected rules packet, the segment of the base document to be displayed through the first view including at least a portion of the one or more selective parts of the base document, and the portion of the one or more selective parts of the base document to be displayed through the first view being highlighted in the first view comprises:
one or more instructions for presenting the GUI including the first and second views, the first view for editing at least the segment of the base document to be displayed through the first view.

10. The computer program product of claim 2, wherein said one or more instructions for presenting a graphical user interface (GUI) for editing the base document, the GUI including at least a first view for displaying at least a segment of the base document and a second view for displaying at least a segment of the one or more selective parts of the base document selected based on the elected rules packet, the segment of the base document to be displayed through the first view including at least a portion of the one or more selective parts of the base document, and the portion of the one or more selective parts of the base document to be displayed through the first view being highlighted in the first view comprises:
one or more instructions for presenting the GUI including the first and second views, the first view for displaying at least the segment of the base document including at least the portion of the one or more selective parts of the base document, the portion of the one or more selective parts of the base document to be displayed through the first view being at least a part of the segment of the one or more selective parts of the base document to be displayed through the second view.

11. The computer program product of claim 10, wherein said one or more instructions for presenting the GUI including the first and second views, the first view for displaying at least the segment of the base document including at least the portion of the one or more selective parts of the base document, the portion of the one or more selective parts of the base document to be displayed through the first view being at least a part of the segment of the one or more selective parts of the base document to be displayed through the second view comprises:
one or more instructions for presenting the GUI including the first and second views, the first view for displaying at least the segment of the base document including at least the portion of the one or more selective parts of the base document, the portion of the one or more selective parts of the base document to be displayed through the first view being equivalent to the segment of the one or more selective parts of the base document to be displayed through the second view.

12. The computer program product of claim 2, wherein said one or more instructions for presenting a graphical user interface (GUI) for editing the base document, the GUI including at least a first view for displaying at least a segment of the base document and a second view for displaying at least a segment of the one or more selective parts of the base document selected based on the elected rules packet, the segment of the base document to be displayed through the first view including at least a portion of the one or more selective parts of the base document, and the portion of the one or more selective parts of the base document to be displayed through the first view being highlighted in the first view comprises:
one or more instructions for presenting the GUI including the first and second views, the portion of the one or more selective parts of the base document to be displayed through the first view being highlighted by having one or more characteristics that are not shared by one or more unhighlighted portions of the segment of the base document that are to be displayed through the first view.

13. The computer program product of claim 2, wherein said one or more instructions for presenting a graphical user interface (GUI) for editing the base document, the GUI including at least a first view for displaying at least a segment of the base document and a second view for displaying at least a segment of the one or more selective parts of the base document selected based on the elected rules packet, the segment of the base document to be displayed through the first view including at least a portion of the one or more selective parts of the base document, and the portion of the one or more selective parts of the base document to be displayed through the first view being highlighted in the first view comprises:
one or more instructions for presenting the GUI including the first and second views, the portion of the one or more selective parts of the base document to be displayed through the first view being automatically highlighted in response to presenting the GUI and without being prompted by an end user.

14. The computer program product of claim 2, wherein said one or more instructions for presenting a graphical user interface (GUI) for editing the base document, the GUI including at least a first view for displaying at least a segment of the base document and a second view for displaying at least a segment of the one or more selective parts of the base document selected based on the elected rules packet, the segment of the base document to be displayed through the first view including at least a portion of the one or more selective parts of the base document, and the portion of the one or more selective parts of the base document to be displayed through the first view being highlighted in the first view comprises:
one or more instructions for presenting the GUI including the first and second views, the portion of the one or more selective parts of the base document to be displayed through the first view being highlighted in response to receiving a request for highlighting the portion of the one or more selective parts of the base document to be displayed through the first view.

15. The computer program product of claim 14, wherein said one or more instructions for presenting the GUI including the first and second views, the portion of the one or more selective parts of the base document to be displayed through the first view being highlighted in response to receiving a request for highlighting the portion of the one or more selective parts of the base document to be displayed through the first view comprises:
one or more instructions for presenting the GUI including the first and second views, the portion of the one or more selective parts of the base document to be displayed through the first view being highlighted in response to receiving the request via the GUI.

16. The computer program product of claim 15, wherein said one or more instructions for presenting the GUI including the first and second views, the portion of the one or more selective parts of the base document to be displayed through the first view being highlighted in response to receiving the request via the GUI comprises:
one or more instructions for presenting the GUI including the first and second views, the portion of the one or more selective parts of the base document to be displayed through the first view being highlighted in response to receiving the request via the second view.

17. The computer program product of claim 16, wherein said one or more instructions for presenting the GUI including the first and second views, the portion of the one or more selective parts of the base document to be displayed through the first view being highlighted in response to receiving the request via the second view comprises:
one or more instructions for presenting the GUI including the first and second views, the portion of the one or more selective parts of the base document to be displayed through the first view being highlighted in response to receiving the request via the second view, the second view being an interactive view for inputting at least the request.

18. The computer program product of claim 2, wherein said one or more instructions for presenting a graphical user interface (GUI) for editing the base document, the GUI including at least a first view for displaying at least a segment of the base document and a second view for displaying at least a segment of the one or more selective parts of the base document selected based on the elected rules packet, the segment of the base document to be displayed through the first view including at least a portion of the one or more selective parts of the base document, and the portion of the one or more selective parts of the base document to be displayed through the first view being highlighted in the first view comprises:
one or more instructions for presenting the GUI including the first and second views, the second view for concurrently displaying all of the one or more selective parts of the base document that were selected based on the elected rules packet.

19. The computer program product of claim 2, wherein said one or more instructions for presenting a graphical user interface (GUI) for editing the base document, the GUI including at least a first view for displaying at least a segment of the base document and a second view for displaying at least a segment of the one or more selective parts of the base document selected based on the elected rules packet, the segment of the base document to be displayed through the first view including at least a portion of the one or more selective parts of the base document, and the portion of the one or more selective parts of the base document to be displayed through the first view being highlighted in the first view comprises:
one or more instructions for presenting the GUI including the first and second views, the second view for sequentially displaying the one or more selective parts of the base document one selective part at a time.

20. The computer program product of claim 2, wherein said one or more instructions for presenting a graphical user interface (GUI) for editing the base document, the GUI including at least a first view for displaying at least a segment of the base document and a second view for displaying at least a segment of the one or more selective parts of the base document selected based on the elected rules packet, the segment of the base document to be displayed through the first view including at least a portion of the one or more selective parts of the base document, and the portion of the one or more selective parts of the base document to be displayed through the first view being highlighted in the first view comprises:
one or more instructions for presenting the GUI including the first and second views, the second view for displaying at least a segment of two or more selective parts selected from the base document including displaying at least a segment of two or more discontinuous selective parts of the base document selected based on the elected rules packet.

21. The computer program product of claim 20, wherein said one or more instructions for presenting the GUI including the first and second views, the second view for displaying at least a segment of two or more selective parts selected from the base document including displaying at least a segment of two or more discontinuous selective parts of the base document selected based on the elected rules packet comprises:
one or more instructions for presenting the GUI including the first and second views, the second view for concurrently displaying two or more of the discontinuous selective parts of the base document.

22. The computer program product of claim 2, wherein said one or more instructions for presenting a graphical user interface (GUI) for editing the base document, the GUI including at least a first view for displaying at least a segment of the base document and a second view for displaying at least a segment of the one or more selective parts of the base document selected based on the elected rules packet, the segment of the base document to be displayed through the first view including at least a portion of the one or more selective parts of the base document, and the portion of the one or more selective parts of the base document to be displayed through the first view being highlighted in the first view comprises:
one or more instructions for presenting the GUI including the first and second views, the second view for displaying one or more interpretive versions of at least the selective parts of the base document that were selected based on the elected rules packet.

23. The computer program product of claim 22, wherein said one or more instructions for presenting the GUI including the first and second views, the second view for displaying one or more interpretive versions of at least the selective parts of the base document that were selected based on the elected rules packet comprises:
one or more instructions for presenting the GUI including the first and second views, the second view for displaying one or more summarized versions of at least the selective parts of the base document that were selected based on the elected rules packet.

24. The computer program product of claim 2, wherein said one or more instructions for presenting a graphical user interface (GUI) for editing the base document, the GUI including at least a first view for displaying at least a segment of the base document and a second view for displaying at least a segment of the one or more selective parts of the base document selected based on the elected rules packet, the segment of the base document to be displayed through the first view including at least a portion of the one or more selective parts of the base document, and the portion of the one or more selective parts of the base document to be displayed through the first view being highlighted in the first view comprises:
   one or more instructions for presenting the GUI including the first and second views, the second view including a scrolling feature to display through the second view different segments of the one or more selective parts of the base document selected based on the elected rules packet.

25. The computer program product of claim 2, wherein said one or more instructions for presenting a graphical user interface (GUI) for editing the base document, the GUI including at least a first view for displaying at least a segment of the base document and a second view for displaying at least a segment of the one or more selective parts of the base document selected based on the elected rules packet, the segment of the base document to be displayed through the first view including at least a portion of the one or more selective parts of the base document, and the portion of the one or more selective parts of the base document to be displayed through the first view being highlighted in the first view comprises:
   one or more instructions for presenting the GUI including the first and second views, the second view being an interactive view designed for controlling which segment of the base document is to be displayed through the first view.

26. The computer program product of claim 25, wherein said one or more instructions for presenting the GUI including the first and second views, the second view being an interactive view designed for controlling which segment of the base document is to be displayed through the first view comprises:
   one or more instructions for presenting the GUI including the first and second views, the second view being an interactive view designed to facilitate an end user to input a selection of at least one of the one or more selective parts of the base document to be displayed through the second view, and the first view being designed to display, in response to the selection made by the end user, at least a segment of the base document that includes at least one of the one or more selective parts of the base document selected by the end user.

27. The computer program product of claim 26, wherein said one or more instructions for presenting the GUI including the first and second views, the second view being an interactive view designed to facilitate an end user to input a selection of at least one of the one or more selective parts of the base document to be displayed through the second view, and the first view being designed to display, in response to the selection made by the end user, at least a segment of the base document that includes at least one of the one or more selective parts of the base document selected by the end user comprises:
   one or more instructions for presenting the GUI including the first and second views, the first view being designed to display, in response to the selection made by the end user, at least a segment of the base document that includes at least one of the one or more selective parts of the base document selected by the end user, the at least one of the one or more selective parts of the base document to be displayed through the first view being highlighted in the first view.

28. The computer program product of claim 2, wherein said one or more instructions for presenting a graphical user interface (GUI) for editing the base document, the GUI including at least a first view for displaying at least a segment of the base document and a second view for displaying at least a segment of the one or more selective parts of the base document selected based on the elected rules packet, the segment of the base document to be displayed through the first view including at least a portion of the one or more selective parts of the base document, and the portion of the one or more selective parts of the base document to be displayed through the first view being highlighted in the first view comprises:
   one or more instructions for presenting the GUI including the first and second views, the GUI to be presented including an identifier associated with the elected rules packet.

29. The computer program product of claim 28, wherein said one or more instructions for presenting the GUI including the first and second views, the GUI to be presented including an identifier associated with the elected rules packet comprises:
   one or more instructions for presenting the GUI including the identifier associated with the elected rules packet, the identifier being an identifier associated with a source for the elected rules packet.

30. The computer program product of claim 28, wherein said one or more instructions for presenting the GUI including the first and second views, the GUI to be presented including an identifier associated with the elected rules packet comprises:
   one or more instructions for presenting the GUI including the identifier associated with the elected rules packet, the identifier being an identifier associated with an entity employing the elected rules packet.

31. The computer program product of claim 28, wherein said one or more instructions for presenting the GUI including the first and second views, the GUI to be presented including an identifier associated with the elected rules packet comprises:
   one or more instructions for presenting the GUI including the identifier associated with the elected rules packet, the identifier being an identifier associated with a creator/author of the elected rules packet.

32. The computer program product of claim 2, wherein said one or more instructions for presenting a graphical user interface (GUI) for editing the base document, the GUI including at least a first view for displaying at least a segment of the base document and a second view for displaying at least a segment of the one or more selective parts of the base document selected based on the elected rules packet, the segment of the base document to be displayed through the first view including at least a portion of the one or more selective parts of the base document, and the portion of the one or more selective parts of the base document to be displayed through the first view being highlighted in the first view comprises:
   one or more instructions for presenting the GUI including the first and second views including at least presenting a GUI that includes a first and a second window, the first window for displaying at least the segment of the base document and the second window for displaying at least the segment of the one or more selective parts of the base document selected based on the elected rules packet.

33. The computer program product of claim 32, wherein said one or more instructions for presenting the GUI including the first and second views including at least presenting a GUI that includes a first and a second window, the first window for displaying at least the segment of the base document and the second window for displaying at least the segment of the one or more selective parts of the base document selected based on the elected rules packet comprises:
one or more instructions for presenting the GUI including the first and second windows, the first and second windows to be concurrently displayed through a hardware user interface.

34. The computer program product of claim 32, wherein said one or more instructions for presenting the GUI including the first and second views including at least presenting a GUI that includes a first and a second window, the first window for displaying at least the segment of the base document and the second window for displaying at least the segment of the one or more selective parts of the base document selected based on the elected rules packet comprises:
one or more instructions for presenting the GUI including the first and second windows, the first and second windows to be sequentially displayed through a hardware user interface.

35. The computer program product of claim 2, said one or more non-transitory computer readable media further including at least:
one or more instructions for modifying the base document including modifying the one or more selective parts of the base document in response to receiving input from an end user; and
one or more instructions for transmitting the modified base document to a potential recipient, the potential recipient being associated with the elected rules packet.

36. The computer program product of claim 35, wherein said one or more instructions for transmitting the modified base document to a potential recipient, the potential recipient being associated with the elected rules packet comprises:
one or more instructions for transmitting the modified base document to the potential recipient, the potential recipient being a source for the elected rules packet.

37. The computer program product of claim 35, wherein said one or more instructions for transmitting the modified base document to a potential recipient, the potential recipient being associated with the elected rules packet comprises:
one or more instructions for transmitting the modified base document to the potential recipient, the potential recipient being a user of the elected rules packet.

38. The computer program product of claim 2, said one or more non-transitory computer readable media further including at least:
one or more instructions for acquiring the elected rules packet in response to receiving the indication of the election of the rules packet.

39. The computer program product of claim 38, wherein said one or more instructions for acquiring the elected rules packet in response to receiving the indication of the election of the rules packet comprises:
one or more instructions for retrieving the elected rules packet from a memory.

40. The computer program product of claim 38, wherein said one or more instructions for acquiring the elected rules packet in response to receiving the indication of the election of the rules packet comprises:

one or more instructions for transmitting a request for the elected rules packet via one or more communication networks; and
one or more instructions for receiving the elected rules packet in response to the transmission of the request.

41. The computer program product of claim 40, wherein said one or more instructions for transmitting a request for the elected rules packet via one or more communication networks comprises:
one or more instructions for transmitting the request to a potential recipient of the base document, the potential recipient being associated with the elected rules packet.

42. The computer program product of claim 40, wherein said one or more instructions for transmitting a request for the elected rules packet via one or more communication networks comprises:
one or more instructions for transmitting the request to one or more servers.

43. A computationally-implemented system, comprising:
means for receiving indication of an election of a rules packet, the elected rules packet including one or more rules for selecting one or more selective parts of a base document for selective presentation, including at least:
means for receiving the indication of the election of the rules packet by receiving the indication of the election of the rules packet elected from a plurality of rules packets, at least one of the plurality of rules packets that the elected rules packet is elected from being associated with one or more particular communication channels; and
means for presenting a graphical user interface (GUI) for editing the base document, the GUI including at least a first view for displaying at least a segment of the base document and a second view for displaying at least a segment of the one or more selective parts of the base document selected based on the elected rules packet, the segment of the base document to be displayed through the first view including at least a portion of the one or more selective parts of the base document, and the portion of the one or more selective parts of the base document to be displayed through the first view being highlighted in the first view.

44. The computer program product of claim 2, wherein said one or more instructions for receiving the indication of the election of the rules packet by receiving the indication of the rules packet elected from a plurality of rules packets, at least one of the plurality of rules packets that the elected rules packet is elected from being associated with one or more particular communication channels comprises:
one or more instructions for receiving the indication of the election of the rules packet including at least receiving the indication of the election of the rules packet elected from a plurality of rules packets, at least one of the plurality of rules packets that the elected rules packet is elected from being associated with one or more particular communication channels, the one or more particular communication channels including at least one of a social networking channel, an email channel, a text message channel, or an internal corporate channel.

45. The computer program product of claim 2, wherein said one or more instructions for receiving the indication of the election of the rules packet by receiving the indication of the rules packet elected from a plurality of rules packets, at least one of the plurality of rules packets that the elected rules packet is elected from being associated with one or more particular communication channels comprises:

one or more instructions for receiving the indication of the election of the rules packet including at least receiving the indication of the election of the rules packet elected from a plurality of rules packets, at least one of the plurality of rules packets that the elected rules packet is elected from being associated with one or more particular communication channels, the one or more instructions for receiving being configured for receiving the indication of the election of the rules packet at least in part via a user interface configured to display one or more identifiers associated with the one or more particular communication channels.

46. The computer program product of claim 22, wherein said one or more instructions for presenting the GUI including the first and second views, the second view for displaying one or more interpretive versions of at least the selective parts of the base document that were selected based on the elected rules packet comprises:

one or more instructions for presenting the GUI including the first and second views, the second view for displaying one or more interpretive versions of at least the selective parts of the base document that were selected based on the elected rules packet, the interpretative versions including at least one or more semantic summaries of at least some of the selective parts of the base document.

47. The computer program product of claim 2, wherein said one or more instructions for receiving the indication of the election of the rules packet by receiving the indication of the rules packet elected from a plurality of rules packets, at least one of the plurality of rules packets that the elected rules packet is elected from being associated with one or more particular communication channels comprises:

One or more instructions for receiving the indication of the election of the rules packet that is elected from a plurality of rules packets wherein the at least one of the plurality of rules packets that is associated with the one or more particular communication channels is associated with the one or more particular communication channels by being customized for the one or more particular communication channels, including at least partly by being configured to provide one or more particular views of the base document through the one or more particular communication channels.

48. The computer program product of claim 2, wherein said one or more instructions for receiving the indication of the election of the rules packet by receiving the indication of the rules packet elected from a plurality of rules packets, at least one of the plurality of rules packets that the elected rules packet is elected from being associated with one or more particular communication channels comprises:

one or more instructions for receiving the indication of the election of a rules packet that is customized for the one or more particular communication channels, including at least partly by being configured for providing via the GUI at least a preview of the base document that is indicative of how the base document would appear when viewed using the elected rules packet with the one or more particular channels; and wherein said one or more non-transitory computer readable media further include at least:

one or more instructions for modifying the base document including modifying the one or more selective parts of the base document in response to receiving input from an end user; and one or more instructions for transmitting the modified base document to a potential recipient that is associated with the elected rules packet and with the one or more particular communication channels.

\* \* \* \* \*